US012783883B2

(12) United States Patent
Sreeramachandra Murthy et al.

(10) Patent No.: US 12,783,883 B2
(45) Date of Patent: Nov. 3, 2026

(54) METHOD FOR UNSUPERVISED IDENTIFICATION OF SINGLE-CELL MORPHOLOGICAL PROFILING BASED ON DEEP LEARNING

(71) Applicant: The University of Hong Kong, Hong Kong (HK)

(72) Inventors: Rashmi Sreeramachandra Murthy, Hong Kong (HK); Kin Man Tsia, Hong Kong (HK)

(73) Assignee: The University of Hong Kong, Hong Kong (HK)

( * ) Notice: Subject to any disclaimer, the term of this patent is extended or adjusted under 35 U.S.C. 154(b) by 662 days.

(21) Appl. No.: 18/472,276

(22) Filed: Sep. 22, 2023

(65) Prior Publication Data

US 2024/0112026 A1 Apr. 4, 2024

Related U.S. Application Data

(60) Provisional application No. 63/410,289, filed on Sep. 27, 2022.

(51) Int. Cl.
*G06N 3/08* (2023.01)
*G06N 3/0475* (2023.01)

(52) U.S. Cl.
CPC ............. *G06N 3/08* (2013.01); *G06N 3/0475* (2023.01)

(58) Field of Classification Search
CPC ............................... G06N 3/08; G06N 3/0475
See application file for complete search history.

(56) References Cited

U.S. PATENT DOCUMENTS

| | | | | |
|---|---|---|---|---|
| 11,367,189 | B2 | 6/2022 | Clymer et al. | |
| 11,488,401 | B2 | 11/2022 | Avenel et al. | |
| 11,564,167 | B2 * | 1/2023 | Kim | H04W 52/0216 |
| 12,075,356 | B2 * | 8/2024 | Islam | H04W 76/28 |
| 12,550,064 | B2 * | 2/2026 | Kim | H04W 52/0235 |

(Continued)

FOREIGN PATENT DOCUMENTS

WO 2022178095 A1 8/2022

OTHER PUBLICATIONS

Y. Sun, G. G. Yen, and Z. Yi, "Evolving Unsupervised Deep Neural Networks for Learning Meaningful Representations," IEEE transactions on evolutionary computation, vol. 23, No. 1, pp. 89-103, 2019, doi: 10.1109/TEVC.2018.2808689.

(Continued)

*Primary Examiner* — David E Choi
(74) *Attorney, Agent, or Firm* — IDEA Intellectual Limited; Sam T. Yip

(57) ABSTRACT

The present invention relates to systems and methods for automated interpretable and generalizable biological morphological profiling. The method for identifying single-cell morphological profiling based on deep learning includes collecting and pre-processing at least one single-cell image data; training Variational Autoencoder (VAE) by defining an arbitrary dimension size of a latent space; distilling a learnt latent space from the VAE to Generative Adversarial Network (GAN) and training a generator-discriminator combination within the GAN; generating a realistic image aligned with the learnt latent space; and interpreting data by incorporating statistical variance analysis and hierarchical clustering.

20 Claims, 30 Drawing Sheets

(56) References Cited

U.S. PATENT DOCUMENTS

| | | | | |
|---|---|---|---|---|
| 12,666,357 | B2 * | 6/2026 | Babaei | H04W 52/0212 |
| 2019/0297577 | A1 * | 9/2019 | Lin | H04W 52/0235 |
| 2020/0340909 | A1 | 10/2020 | Ohsaka et al. | |
| 2021/0176708 | A1 * | 6/2021 | Liu | H04W 52/0216 |
| 2021/0368437 | A1 * | 11/2021 | Kim | H04W 52/0212 |
| 2022/0078880 | A1 * | 3/2022 | Maleki | H04W 52/0216 |
| 2022/0124624 | A1 * | 4/2022 | Sha | H04W 52/0229 |
| 2022/0201614 | A1 * | 6/2022 | Wang | H04W 52/0216 |
| 2022/0256622 | A1 * | 8/2022 | Li | H04W 52/0216 |
| 2022/0369231 | A1 * | 11/2022 | Ma | H04L 5/0053 |
| 2022/0407664 | A1 * | 12/2022 | Wang | H04L 5/0098 |
| 2023/0247620 | A1 * | 8/2023 | Seo | H04L 5/00 370/329 |
| 2023/0276260 | A1 * | 8/2023 | Abedini | H04L 67/34 370/254 |
| 2024/0047081 | A1 * | 2/2024 | Welch | G06N 3/047 |
| 2024/0049069 | A1 * | 2/2024 | Zhou | H04W 36/0069 |
| 2024/0080152 | A1 * | 3/2024 | Shrivastava | H04L 5/0048 |
| 2024/0224185 | A1 * | 7/2024 | Gokceli | H04W 52/0235 |
| 2024/0244524 | A1 * | 7/2024 | Bala | H04W 52/0229 |
| 2024/0267847 | A1 * | 8/2024 | Esswie | H04W 52/0206 |
| 2024/0283604 | A1 * | 8/2024 | Abedini | H04L 5/0051 |
| 2024/0340795 | A1 * | 10/2024 | Kim | H04L 1/1887 |
| 2024/0381480 | A1 * | 11/2024 | Esswie | H04W 52/0216 |
| 2025/0184899 | A1 * | 6/2025 | Tayyab | H04W 52/0235 |
| 2025/0193795 | A1 * | 6/2025 | Wu | H04W 24/02 |
| 2025/0212121 | A1 * | 6/2025 | Wang | H04W 52/02 |
| 2025/0227609 | A1 * | 7/2025 | Babaei | H04L 5/0092 |
| 2025/0227611 | A1 * | 7/2025 | Oliveira Da Costa | H04W 52/0206 |
| 2025/0280466 | A1 * | 9/2025 | Zhou | H04W 52/0206 |
| 2025/0294459 | A1 * | 9/2025 | Zorgui | H04W 52/0235 |
| 2025/0318009 | A1 * | 10/2025 | Abedini | H04W 76/28 |
| 2025/0350530 | A1 * | 11/2025 | Wang | H04L 41/0806 |
| 2025/0374182 | A1 * | 12/2025 | Baek | H04W 52/0206 |
| 2025/0374195 | A1 * | 12/2025 | Hwang | H04B 17/328 |
| 2025/0386294 | A1 * | 12/2025 | Liu | H04W 52/0206 |
| 2026/0019940 | A1 * | 1/2026 | Islam | H04W 52/0206 |
| 2026/0040206 | A1 * | 2/2026 | Jung | H04W 48/20 |
| 2026/0067829 | A1 * | 3/2026 | Zorgui | H04W 52/325 |
| 2026/0129572 | A1 * | 5/2026 | Cheng | H04W 52/0206 |
| 2026/0172934 | A1 * | 6/2026 | Wang | H04W 36/165 |
| 2026/0206093 | A1 * | 7/2026 | Basu Mallick | H04W 76/28 |

OTHER PUBLICATIONS

C. P. Burgess et al., "Understanding disentangling in β-VAE," 2018, doi: 10.48550/arxiv.1804.03599.

H. Kim and A. Mnih, "Disentangling by Factorising," 2018, doi: 10.48550/arxiv.1802.05983.

P. Isola, Z. Jun-Yan, Z. Tinghui, and A. A. Efros, "Image-to-Image Translation with Conditional Adversarial Networks," 2017: IEEE, pp. 5967-5976, doi: 10.1109/CVPR.2017.632.

W. Lee et al., "High-Fidelity Synthesis with Disentangled Representation," vol. 12371, (Lecture Notes in Computer Science. Switzerland: Springer International Publishing AG, 2020, pp. 157-174.

V. Ljosa, K. L. Sokolnicki, and A. E. Carpenter, "Annotated high-throughput microscopy image sets for validation," Nature methods, vol. 9, No. 7, pp. 637-637, 2012, doi: 10.1038/nmeth.2083.

E. Williams et al., "Image Data Resource: a bioimage data integration and publication platform," Nature methods, vol. 14, No. 8, pp. 775-781, 2017, doi: 10.1038/NMETH.4326.

P. J. Thul et al., "A subcellular map of the human proteome," Science (American Association for the Advancement of Science), vol. 356, No. 6340, pp. 820-820, 2017, doi: 10.1126/science.aal3321.

N. H. Cho et al., "OpenCell: Endogenous tagging for the cartography of human cellular organization," Science (American Association for the Advancement of Science), vol. 375, No. 6585, pp. eabi6983-eabi6983, 2022, doi: 10.1126/science.abi6983.

M. P. Viana et al., "Integrated intracellular organization and its variations in human iPS cells," Nature (London), vol. 613, No. 7943, pp. 345-354, 2023, doi: 10.1038/s41586-022-05563-7.

G. P. Way et al., "Morphology and gene expression profiling provide complementary information for mapping cell state," Cell Systems, 13, 2022.

K. A. Gerbin et al., "Cell states beyond transcriptomics: integrating structural organization and gene expression in hiPSC-derived cardiomyocytes," Cell Systems, 12, 2021.

A. E. Carpenter et al., "CellProfiler: image analysis software for identifying and quantifying cell phenotypes," Genome Biology, vol. 7, No. 10, pp. R100-R100, 2006, doi: 10.1186/GB-2006-7-10-r100.

K. C. M. Lee, J. Guck, K. Goda, and K. K. Tsia, "Toward Deep Biophysical Cytometry: Prospects and Challenges," Trends in Biotechnology (Regular ed.), vol. 39, No. 12, pp. 1249-1262, 2021, doi: 10.1016/j.tibtech.2021.03.006.

D. M. D. Siu et al., "Deep-learning-assisted biophysical imaging cytometry at massive throughput delineates cell population heterogeneity," Lab on a chip, vol. 2, No. 2, pp. 3696-3708, 2020, doi: 10.1039/DOLC00542H.

M.-A. Bray et al., "Cell Painting, a high-content image-based assay for morphological profiling using multiplexed fluorescent dyes," Nature protocols, vol. 11, No. 9, pp. 1757-1774, 2016, doi: 10.1038/nprot.2016.105.

W. Samek, G. g. Montavon, A. Vedaldi, L. K. Hansen, and K.-R. Müller, "Explainable AI : interpreting, explaining and visualizing deep learning," Explainable artificial intelligence, 2019, doi: 10.1007/978-3-030-28954-6.

E. Tjoa and C. Guan, "A Survey on Explainable Artificial Intelligence (XAI): Towards Medical XAI," IEEE Transactions on Neural Networks and Learning Systems, vol. 32, No. 11, 2021, doi: 10.1109/TNNLS.2020.3027314.

D. P. Kingma and M. Welling, "Auto-Encoding Variational Bayes," ed. Ithaca: Cornell University Library, arXiv.org, 2022.

Z. Wu et al., "DynaMorph: self-supervised learning of morphodynamic states of live cells," Molecular Biology of the Cell, vol. 33, No. 6, pp. ar59-ar59, 2022, doi: 10.1091/mbc.E21-11-0561.

A. Zaritsky et al., "Interpretable deep learning of label-free live cell images uncovers functional hallmarks of highly-metastatic melanoma," ed. Cold Spring Harbor: Cold Spring Harbor Laboratory Press, 2020.

H. Kobayashi, K. C. Cheveralls, M. D. Leonetti, and L. A. Royer, "Self-supervised deep learning encodes high-resolution features of protein subcellular localization," Nature methods, vol. 19, No. 8, pp. 995-1003, 2022, doi: 10.1038/s41592-022-01541-z.

I. Higgins et al., "SCAN: Learning Hierarchical Compositional Visual Concepts," 2017, doi: 10.48550/arxiv.1707.03389.

A. v. d. Oord, O. Vinyals, and K. Kavukcuoglu, "Neural Discrete Representation Learning," 31st Conference on Neural Information Processing Systems, 2017, doi: 10.48550/arxiv.1711.00937.

K. C. M. Lee et al., "Multi-ATOM: Ultrahigh-throughput single-cell quantitative phase imaging with subcellular resolution," Journal of Biophotonics, vol. 12, No. 7, pp. e201800479, 2019, doi: 10.1002/jbio.201800479.

S. V. Stassen, G. G. K. Yip, K. K. Y. Wong, J. W. K. Ho, and K. K. Tsia, "Generalized and scalable trajectory inference in single-cell omics data with VIA," Nature communications, vol. 12, No. 1, pp. 5528-5528, 2021, doi: 10.1038/s41467-021-25773-3.

M. L. Montero, J. S. Bowers, R. P. Costa, C. J. H. Ludwig, and G. Malhotra, "Lost in Latent Space: Disentangled Models and the Challenge of Combinatorial Generalisation," 2022, doi: 10.48550/arxiv.2204.02283.

A. Kumar, P. Sattigeri, and A. Balakrishnan, "Variational Inference of Disentangled Latent Concepts from Unlabeled Observations," 2017, doi: 10.48550/arxiv.1711.00848.

E. Becht et al., "Dimensionality reduction for visualizing single-cell data using UMAP," Nature Biotechnology, vol. 37, No. 1, pp. 38-44, 2019, doi: 10.1038/nbt.4314.

K. R. Moon et al., "Visualizing structure and transitions in high-dimensional biological data," Nature Biotechnology, vol. 37, No. 12, pp. 1482-1492, 2019, doi: 10.1038/s41587-019-0336-3.

(56) References Cited

OTHER PUBLICATIONS

W. Wang et al., "Live-cell imaging and analysis reveal cell phenotypic transition dynamics inherently missing in snapshot data," Science Advances, vol. 6, No. 36, 2020, doi: 10.1126/sciadv.aba9319.
C. Edlund et al., "LIVECell—A large-scale dataset for label-free live cell segmentation," Nature methods, vol. 18, No. 9, pp. 1038-1045, 2021, doi: 10.1038/s41592-021-01249-6.
Q. T. K. Lai et al., "High-speed laser-scanning biological microscopy using FACED," Nature protocols, vol. 16, No. 9, pp. 4227-4264, 2021, doi: 10.1038/s41596-021-00576-4.
G. G. K. Yip et al., "Multimodal FACED imaging for large-scale single-cell morphological profiling," APL photonics, vol. 6, No. 7, 070801, 2021, doi: 10.1063/5.0054714.
T. Q. Chen, X. Li, R. Grosse, and D. Duvenaud, "Isolating Sources of Disentanglement in Variational Autoencoders," 2018, doi: 10.48550/arxiv.1802.04942.
M.-A. Carbonneau, J. Zaidi, J. Boilard, and G. Gagnon, "Measuring Disentanglement: A Review of Metrics," IEEE transaction on neural networks and learning systems, pp. 1-15, 2022, doi: 10.1109/TNNLS.2022.3218982.

* cited by examiner

METHOD FOR UNSUPERVISED IDENTIFICATION OF SINGLE-CELL MORPHOLOGICAL PROFILING BASED ON DEEP LEARNING

CROSS-REFERENCE TO RELATED APPLICATIONS

The present application claims the priorities from the U.S. provisional patent application Ser. No. 63/410,289 filed Sep. 27, 2022, and the disclosure of which is incorporated herein by reference in its entirety.

FIELD OF THE INVENTION

The present invention generally relates to systems and methods for automated interpretable and generalizable biological morphological profiling.

BACKGROUND OF THE INVENTION

Advanced microscopy has catalyzed a paradigm shift in cell biology, elevating it to a data-driven scientific discipline. This transformation has empowered researchers to explore the intricate structural and functional attributes of cell morphology, offering profound insights into cellular health, disease mechanisms, and the responses of cells to chemical and genetic perturbations. Recent years have borne witness to a remarkable surge in openly accessible image data repositories[1-5] and the emergence of robust machine learning techniques for deciphering cellular morphological profiles, herein referred to as fingerprints.

Mounting evidence suggests that these morphological profiles harbor vital information about cell functions and behaviors, often concealed within molecular assays. Significantly, studies have revealed the complementary nature of cell morphology and gene expression profiling in genetic and chemical perturbations[6, 7].

Traditional morphological profiling methods have long relied on manual feature extraction, a labor-intensive process that demands domain expertise and often lacks scalability and applicability across various imaging modalities. These conventional techniques entail the creation of features based on cellular attributes, including shape, size, texture, and pixel intensities, in order to assign a unique identity to each cell. In-depth and precise comprehension of complex biological processes, such as cell heterogeneity, mitosis, disease mechanisms, and drug responses, requires approaches capable of extracting a wealth of cellular information at single-cell precision. Among these approaches, cellular imaging stands out for its unique ability to capture multifaceted morphological details at high resolution, producing comprehensive morphological profiles, often referred to as fingerprints. These profiles can be subjected to a range of computational methods for downstream analysis.

The process of image-based single-cell morphological profiling places substantial demands on expertise spanning multiple disciplines, including imaging, biology, and computer science. It involves the meticulous definition and extraction of numerous features, often resulting in a high-dimensional feature space. Moreover, the extraction of hundreds to thousands of morphological features from a single image empowers the investigation of complex cellular properties with remarkable discriminatory power, such as responses to drug treatments[8, 9]. However, manual feature extraction is vulnerable to the "curse of dimensionality," potentially introducing biases since the selected features may not fully represent the underlying data.

Deep learning techniques, which employ supervised or weakly supervised learning, have shown promise in improving image classification accuracy[10]. However, these methods necessitate extensive labeling or annotation of training datasets by experts, which can be time-consuming and susceptible to human biases[11]. Moreover, deep learning often suffers from a lack of interpretability. An ideal cell morphology profiling strategy should generate features without relying on human knowledge, drawing inferences solely from the images themselves, without any preconceived assumptions. Embracing such an approach would facilitate a more objective and unbiased analysis of cellular morphology, thereby overcoming the limitations associated with manual annotation and expert knowledge. Simultaneously, the deep-learned morphological profile should be effectively interpretable (and explainable) to enhance the transparency and credibility of the deep learning model, especially in the context of biomedical diagnosis[12, 13].

US20200340909A1 provides a method for supporting disease analysis, the method including classifying, on the basis of images obtained from a plurality of analysis target cells contained in a specimen collected from a subject, a morphology of each analysis target cell, and obtaining cell morphology classification information corresponding to the specimen, on the basis of a result of the classification; and analyzing a disease of the subject by means of a computer algorithm, on the basis of the cell morphology classification information. However, it does not comprise an integrative morphological classification method.

U.S. Pat. No. 11,488,401B2 classifies the nuclei in prostate tissue images with a trained deep learning network and uses said nuclear classification to classify regions, such as glandular regions, according to their malignancy grade. The method according to the present invention also trains a deep learning network to identify the category of each nucleus in prostate tissue image data, said category representing the malignancy grade of the tissue surrounding the nuclei. The method automatically segments the glands and identifies the nuclei in a prostate tissue data set. Said segmented glands are assigned a category by at least one domain expert, and said category is then used to automatically assign a category to each nucleus corresponding to the category of said nucleus' surrounding tissue. A multitude of windows, each said window surrounding a nucleus, comprises the training data for the deep learning network. This prior art focuses on performing a binary classification for each image, such as Disease versus Normal tissue, and it is not generalizable to multi-class classification and trajectory inference tasks. Furthermore, it relies on preprocessing that involve separating the image into a plurality of smaller image patches; and analyzing each of the plurality of smaller image patches separately. This prior art also does not teach disentangled latent representation learning and GAN-based image reconstruction/translation.

Thus, providing systems and methods for automated, interpretable, and generalizable biological morphological profiling remains a challenging issue. The present invention addresses this need.

SUMMARY OF THE INVENTION

The following presents a simplified summary of the invention to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

Although deep learning can now be adopted to tackle the problems, its inherent "black box" operation makes it hard to readily provide logical interpretation of the deep-learnt features and thus to offer sensible justifications to the results of the downstream analysis (e.g., classification, correlations, or predictions).

It is important to have interpretability of the deep neural network model employed for prediction and analysis to primarily understand the self-learnt biologically relevant factors and at the same time avoid misleading results, e.g., wrong predictions in the presence of artefacts in the image datasets that are not relevant to the biological context. On the other hand, cellular image analysis is further complicated by the diverse microscopy modalities, which now can reveal a wide range of different image contrasts (beyond the ordinarily perceived grayscale or color images), each of which contains multi-faceted information of the cells, from biochemical, biophysical, to mechanical signatures. Hence, this adds a new level of complexity that makes it difficult to generalize these deep learning models for different imaging modalities and applications.

Accordingly, in a first aspect, the present invention provides a method for identifying single-cell morphological profiling based on deep learning. The design concepts include employing deep learning-based unsupervised disentangled learning and high-fidelity image reconstruction for single-cell morphological profiling, encoding interpretable information in disentangled representations, and exploring generalizability across unseen imaging modalities. In particular, the method includes collecting and pre-processing at least one single-cell image data; training Variational Autoencoder (VAE) by defining an arbitrary dimension size of a latent space; distilling a learnt latent space from the VAE to Generative Adversarial Network (GAN) and training a generator-discriminator combination within the GAN; generating a realistic image aligned with the learnt latent space; and interpreting data by incorporating statistical variance analysis and hierarchical clustering.

The framework utilizes a hybrid architecture that capitalizes on the strengths of the variant of VAEs and GANs to achieve interpretable, high-quality cell image generation[18].

In one of the embodiments, the step of collecting and preprocessing at least one single-cell image data includes center-aligning cells within the single-cell image data and masking cells to eliminate background noise.

In another embodiment, the method further includes performing downstream tasks comprising visualization and trajectory inference after training the VAE.

In one of the embodiments, the step of training the VAE includes mapping at least one high-dimensional images into the latent space in an unsupervised manner, the at least one high-dimensional images are reduced to the latent space via an encoder, and the reduced images are reconstructed via a decoder. The latent space is considered disentangled if the VAE learns independent factors of variation in each dimension of the latent space.

In one of the embodiments, at least one high-dimensional images with morphologically similar cells are mapped into closely spaced aggregates in the latent space.

In one of the embodiments, the GAN's discriminator is trained to detect if the image generated from the GAN's generator is real or fake.

In another embodiment, the method further includes generalizing to analyze new, unseen datasets acquired from different imaging modalities or contrasts.

In one of the embodiments, the VAE is configured to learn the disentangled representations or generative factors and learn how to reconstruct images from those factors, and the step of training the VAE comprises reconstructing at least one target image from the decoder based on the latent space representations predicted by the encoder.

In one of the embodiments, the step of training the VAE includes defining arbitrary number of latent dimensions, where the method further includes using the generator-discriminator combination within the GAN to generate images based on the latent dimensions, so as to generate a series of related images by traversing the latent space, thereby moving within the latent space to explore different image features.

In one of the embodiments, N*1 cell images are generated by traversing one dimension, and d represents the number of the latent dimensions and N*d cell images are generated by traversing the d latent dimensions. The method further includes: extracting F manually defined cellular features from each cell image in latent traversal such that a N*F feature matrix is created with using the generated N*1 cell images. This method further includes computing statistical variance of F features along the latent traversal including the N cell images so as to generate a variance vector 1*F for the single traversal; performing the computing statistical variance for F features along d dimension, so as to obtain d*F variance values; and obtaining a variance matrix representing the d*F variance values. Furthermore, the method further includes preparing a single-cell gallery as a dataset; sampling K number of images from the dataset for obtaining K number of the variance matrices; and computing statistical mean of the obtained K number of the variance matrices to generate a mean-variance matrix which has d rows and F columns, wherein the hierarchical clustering is performed based on the mean-variance matrix, so as to obtaining groupings visualized in the form of a cluster map.

In a second aspect, the present invention provides a programmable computer for identifying single-cell morphological profiling based on deep learning, including a processing unit configured to: collect at least one single-cell image data via a user input and pre-process the single-cell image data; train Variational Autoencoder (VAE) by defining an arbitrary dimension size of a latent space; distil a learnt latent space from the VAE to Generative Adversarial Network (GAN) and train a generator-discriminator combination within the GAN; generate a realistic image aligned with the learnt latent space; and interpret data by incorporating statistical variance analysis and hierarchical clustering.

In one of the embodiments, the step of collecting and preprocessing the at least one single-cell image data includes center-aligning cells within the single-cell image data and masking cells to eliminate background noise, and the programmable computer further comprises a memory configured to store the single-cell image data.

In one of the embodiments, the method further includes performing downstream tasks comprising visualization and trajectory inference after training the VAE, wherein the programmable computer further comprises an output interface configured to display a visualization result.

In one of the embodiments, the VAE is configured to learn the disentangled representations or generative factors and learn how to reconstruct images from those factors, and the step of training the VAE comprises reconstructing at least one target image from the decoder based on the latent space representations predicted by the encoder.

In one of the embodiments, the step of training the VAE includes defining arbitrary number of latent dimensions, wherein the processing unit is further configured to use the generator-discriminator combination within the GAN to generate images based on the latent dimensions, so as to generate a series of related images by traversing the latent space, thereby moving within the latent space to explore different image features, wherein the programmable computer further comprises a memory configured to store the series of the related images.

In one of the embodiments, N*1 cell images are generated by traversing one dimension with variation in each dimension of the latent space, and, by traversing d dimensions, and d represents the number of the latent dimensions and N*d cell images are generated by traversing d latent dimensions, wherein the method further comprises: extracting F manually defined cellular features from each cell image in latent traversal such that a N*F feature matrix is created with using generated N*1 cell images.

In one of the embodiments, the processing unit is further configured to: compute statistical variance of the F features along the latent traversal comprising the N cell images so as to generate a variance vector 1*F for the single traversal; compute statistical variance of F features along d dimension, so as to obtain d*F variance values; and obtain a variance matrix representing the d*F variance values and send the variance matrix to the memory.

In one of the embodiments, the processing unit is further configured to: prepare a single-cell gallery as a dataset; sampling K number of images from the dataset for obtaining K number of the variance matrices; and compute statistical mean of the obtained K number of the variance matrices to generate a mean-variance matrix which has d rows and F columns, wherein the hierarchical clustering is performed based on the mean-variance matrix, so as to obtaining groupings visualized in the form of a cluster map, wherein the programmable computer further comprises an output interface configured to display the visualized groupings.

The present invention transforms single-cell imaging into data-driven science, facilitating the analysis of cell health, disease mechanisms, and responses to perturbations. Traditional approaches require meticulous feature selection and statistical analysis. In the present invention, the integrative unsupervised deep-learning framework tackles challenges related to manual feature extraction and high-dimensional analysis.

BRIEF DESCRIPTION OF THE DRAWINGS

Embodiments of the invention are described in more details hereinafter with reference to the drawings, in which.

DETAILED DESCRIPTION

Figure 1A:
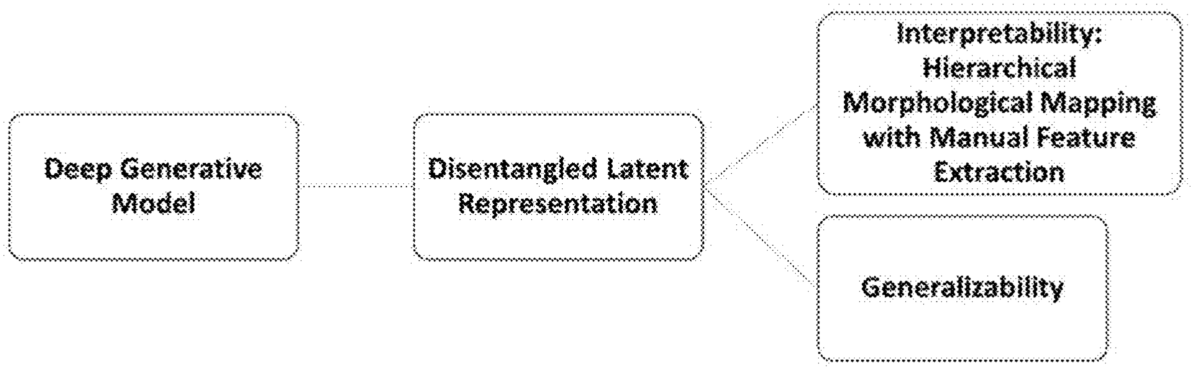
FIG. 1A depicts a flow chart of the method of the present invention.

In the following description, automated computer-implemented framework for morphological profiling of biological systems is set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Unsupervised deep generative networks, notably variational autoencoders or VAEs[14], have gained widespread success in learning interpretable latent representations for downstream analysis and providing insights into neural network model learning. Autoencoders learns to compress input data into a lower-dimensional representation (encoding) and then reconstruct the input image data from this lower-dimensional representation (decoding). Despite their potential, autoencoders often face limitations in lossy image reconstructions. While previous works have employed VAE variants for unsupervised and self-supervised learning of cellular image datasets to reveal cellular dynamics and attempted to interpret the learned latent space[15-17], they have not established a direct and systematic mapping between the learned latent space and interpretable morphological features. This highlights the need for further research to overcome these limitations and enhance morphological profiling of cells.

Accordingly, the present invention provides a new deep learning framework and a method for unsupervised, interpretable single-cell morphological profiling and analysis. A computer-implemented method is presented to automatically identify a plurality of image features learnt from the deep learning models (e.g., deep convolutional neural network) for single-cell morphological profiling. This method involves developing a statistical computational pipeline (involving statistical variance analysis and hierarchical clustering) that offers comprehensive interpretation of the morphological profile learnt from the deep learning model. The method can be generalizable and applicable to the image analysis based on different imaging modality.

The present invention has the following novel elements, among others:

(1) An automated computer-implemented framework for morphological profiling of biological systems (e.g., cells) based on any available microscopy/imaging modalities.

(2) A computational pipeline that offers automated interpretability of the deep-learnt features.

(3) The generalizability of the method, which extends to new, unseen datasets acquired from different imaging modalities and contrasts, including but not limited to quantitative phase, fluorescence, phase contrast, and bright field contrasts.

In a first aspect, the present invention provides a programmable computer for identifying single-cell morphological profiling based on deep learning, including a processing unit configured to: collect at least one single-cell image data via a user input and pre-process the single-cell image data; train Variational Autoencoder (VAE) by defining an arbitrary dimension size of a latent space; distil a learnt latent space from the VAE to Generative Adversarial Network (GAN) and train a generator-discriminator combination within the GAN; generate a realistic image aligned with the learnt latent space; and interpret data by incorporating statistical variance analysis and hierarchical clustering.

FIG. 1A is an overview of the invention highlighting the novel elements from the invention, where the deep generative models incorporated for learning latent space as a disentangled representation. And using the representation to generate visualizations in lower dimensions. The framework consists of a hybrid architecture that combines the strengths of Variational Autoencoders (VAEs) and Generative Adversarial Networks (GANs) to learn disentangled representations while simultaneously acquiring the ability to reconstruct high-fidelity images. It is designed to learn disentangled representations from cell images and subsequently produce high-quality reconstructions.

VAE module learns the compact and interpretable, latent representations. A disentangled latent representation involves encoding the fundamental factors that contribute to the creation of observed data, such as images[21]. Within a disentangled generative model, interpolating the latent factors referred here as "latent traversals" results in the generation of images where only one specific factor changes. This compact representation offers interpretability and transferability benefits.

Various strategies have previously been proposed to encourage a more disentangled latent representation, often involving the incorporation of regularization techniques such as Beta-VAE or factorized approaches[19,20]. While disentanglement enhances interpretability, it can result in less accurate reconstructions of the original data, which poses a challenge when interpreting the latent space based on the reconstructed latent traversals. In contrast, Generative Adversarial Networks (GANs) have showcased their capability to generate realistic reconstructions, particularly in scenarios like BF-Fluorescence. However, latent representations obtained through GANs often exhibit entanglement, which can present challenges for direct interpretability. To address this issue, an unsupervised neural network model inspired by the architecture of the Information Distillation GAN (ID-GAN)[18] has been selected for generating realistic reconstructions.

Figure 1B:
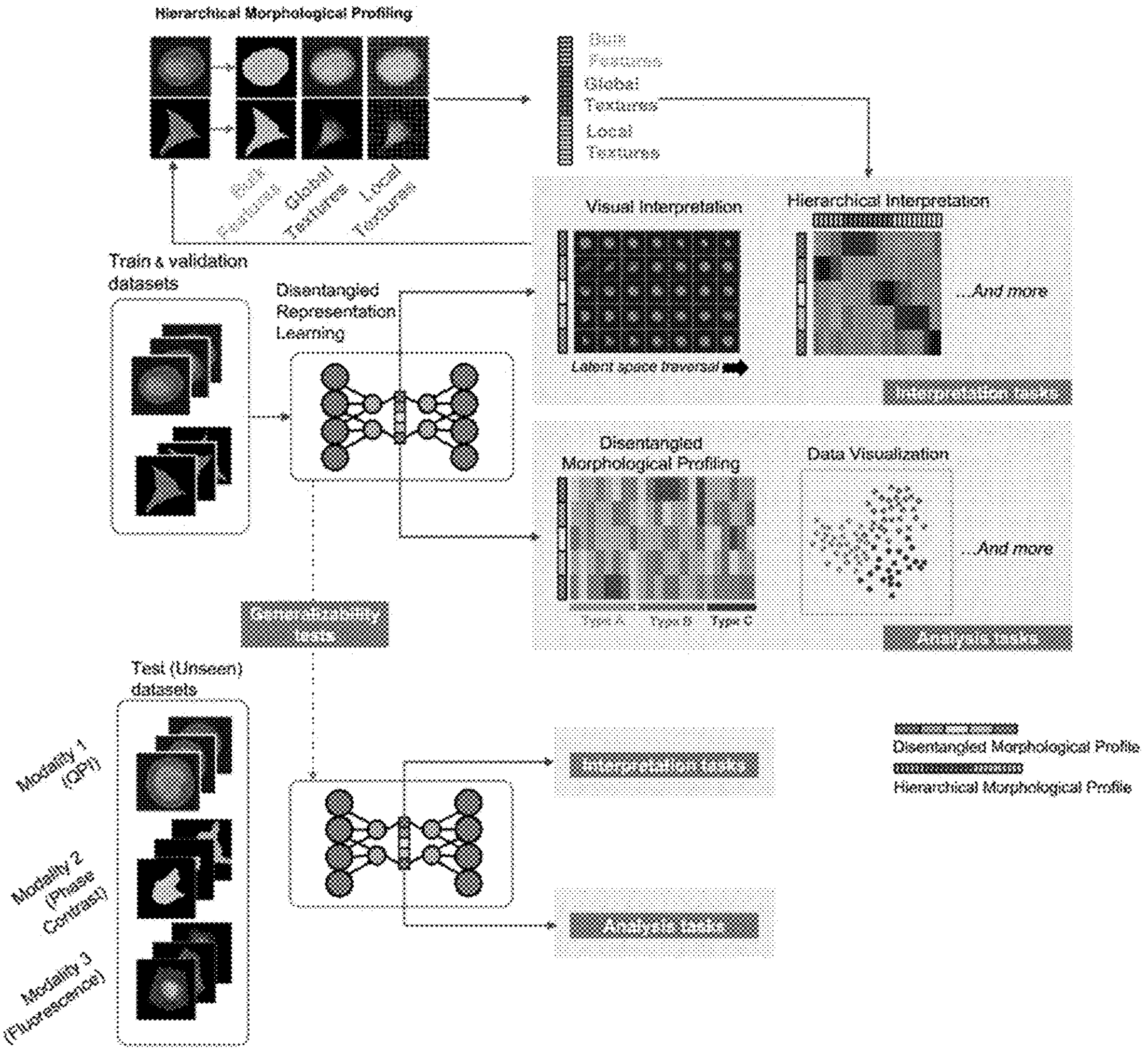
FIG. 1B depicts an overview of the framework of the present invention.

FIG. 1B illustrates the sequential flow of tasks made possible through the integration of disentangled representation learning and high-fidelity image reconstructions. These tasks encompass morphological profiling and downstream analysis, as well as the generation of interpretation heatmaps specific to the training dataset. Additionally, the figure highlights the utilization of a pretrained model, which facilitates cross-modality generalizability for morphological profiling and interpretability within the framework.

In another aspect, the present invention provides a method for identifying single-cell morphological profiling based on deep learning. The design concepts include employing deep learning-based unsupervised disentangled learning and high-fidelity image reconstruction for single-cell morphological profiling, encoding interpretable information in disentangled representations, and exploring generalizability across unseen imaging modalities. In particular, the method includes collecting and pre-processing at least one single-cell image data; training Variational Autoencoder (VAE) by defining an arbitrary dimension size of a latent space; distilling a learnt latent space from the VAE to Generative Adversarial Network (GAN) and training a generator-discriminator combination within the GAN; generating a realistic image aligned with the learnt latent space; and interpreting data by incorporating statistical variance analysis and hierarchical clustering.

The present invention uses the above framework to unsupervised identify single-cell morphological profiling. The method is primarily characterized by the following concepts:

High-Fidelity Image Reconstruction

The present invention directly uses an entire cell image as the model input for image reconstruction/translation, morphological profiling, as well as interpretation in a hierarchical manner. The single-cell image data can come from any imaging device and may have varying levels of contrast.

Figure 2:
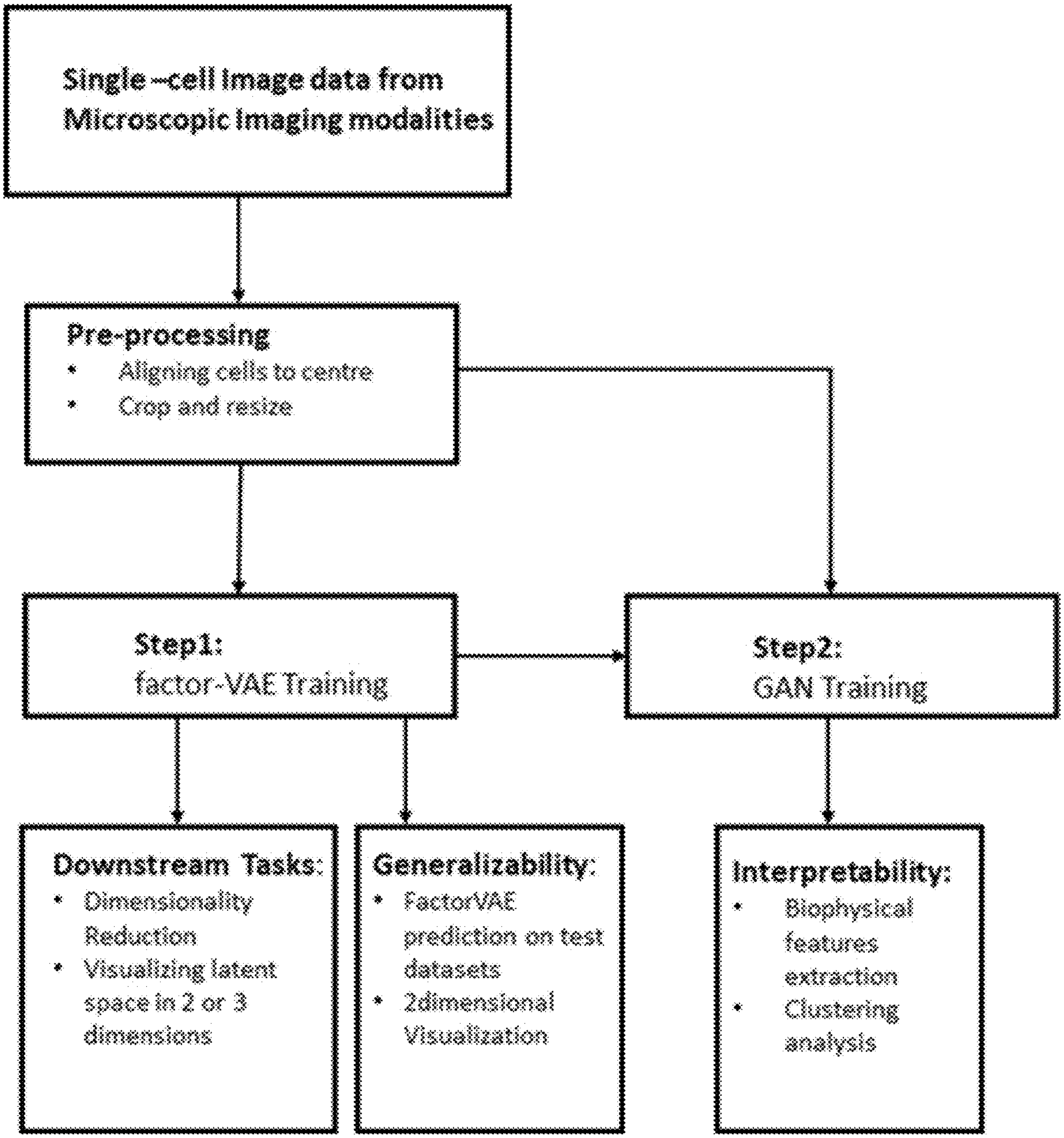
FIG. 2 depicts an exemplary pipeline of the entire method, which includes pre-processing, training the Encoder-Decoder Network (e.g. VAE network) integrated with Generative Adversarial Network (GAN) followed by the steps for interpretability and generalizability.

FIG. 2 is an exemplary flowchart describing the entire flow of the process in the current invention. Image datasets are pre-processed to eliminate any artifacts or noise that the model could mistakenly learn as true factors of variation. This is accomplished by center-aligning the cells and masking them to remove background noise. The pre-processed images are then used to train the VAE.

Figure 3:
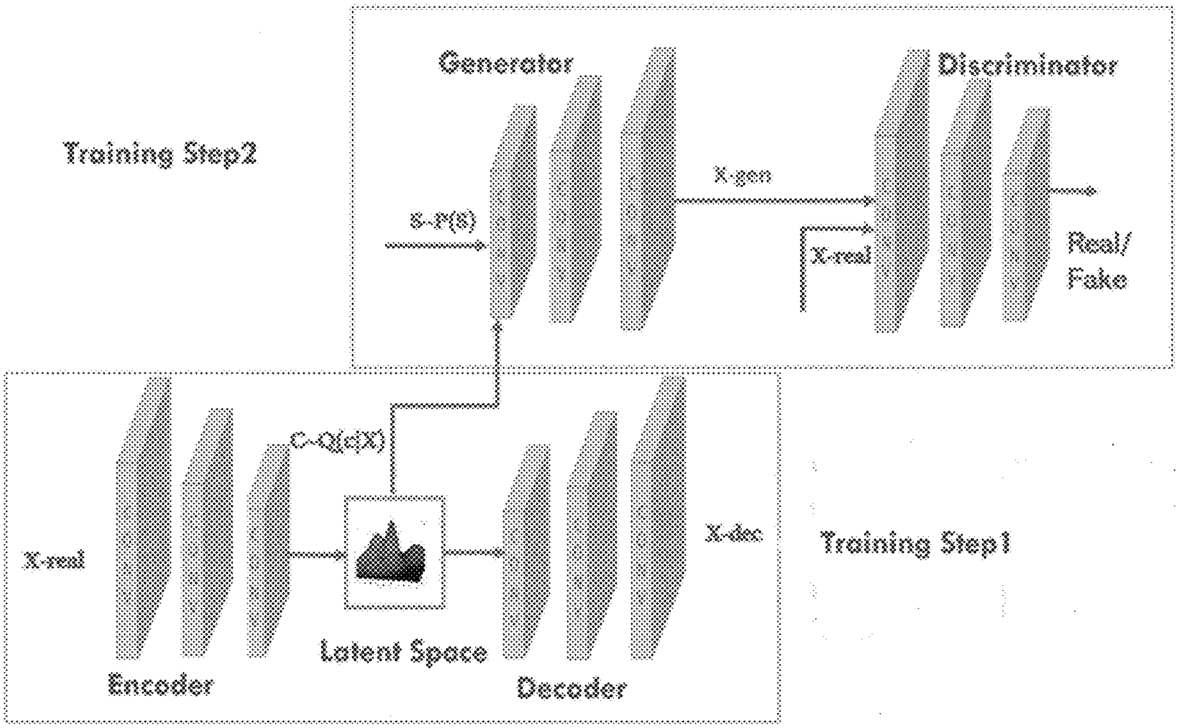
FIG. 3 depicts an exemplary neural network architecture to learn interpretable latent representation and generate cell images without losing subtle morphological or textural information.

FIG. 3 illustrates an example implementation of the combination of two generative neural networks: the Encoder-Decoder network of VAE and the Generator-Discriminator network of GAN.

The training process in ID-GAN unfolds through a two-step approach:

In the first step, the VAE is formulated in a probabilistic manner to learn latent representations from the real image space by utilizing an encoder, and therefore, reduce high-dimensional images into a lower-dimensional space called the latent space. Learned latent space dimensions correspond to various factors of variations present in the image dataset. Image reconstruction from the latent representation is achieved through a decoder. In particular, the encoder reduces images to latent space and the decoder reconstructs images from the latent space. However, the reconstructed image is lossy and finer texture details of the cell is lost. This exhibits a limitation in information flow due to the constrained nature of their compact latent representation. As a result, essential information required for generating realistic reconstructions may be lost in this process.

Downstream tasks, such as visualization, trajectory inference, can be performed after the first step of training the VAE to gain a deeper understanding of the biological processes captured by the dataset used for training. The downstream analysis is performed based on the best disentangled model, assessed through a novel approach that measures disentanglement across various models and a range of hyperparameters. Biologically meaningful 2D visualizations and classifications are obtained for discrete-type datasets, while meaningful trajectory inferences reveal heterogeneities and progressions for datasets showing trajectories.

In one of the embodiments, mapping high-dimensional image into a lower dimensional interpretable representation called the latent space is in an unsupervised manner.

In order to minimize the disparity between the reconstructions and real images while simultaneously learning the generative factors. In view of this, GAN is being trained adversarially. GAN learns to generate realistic images without losing critical biologically relevant information, such as overall cell morphology and intracellular organization.

In a second step, the learned latent space from the first step is distilled to the GAN, and the generator-discriminator combination is trained. The generator is trained by distilling the VAE predicted latent space, instead of using the randomly initialized latent space. The generator generates fake images while simultaneously training a discriminator to distinguish between fake and real images. This training step aims to maximize the alignment of information between the latent representations of real and generated images.

Figure 18:
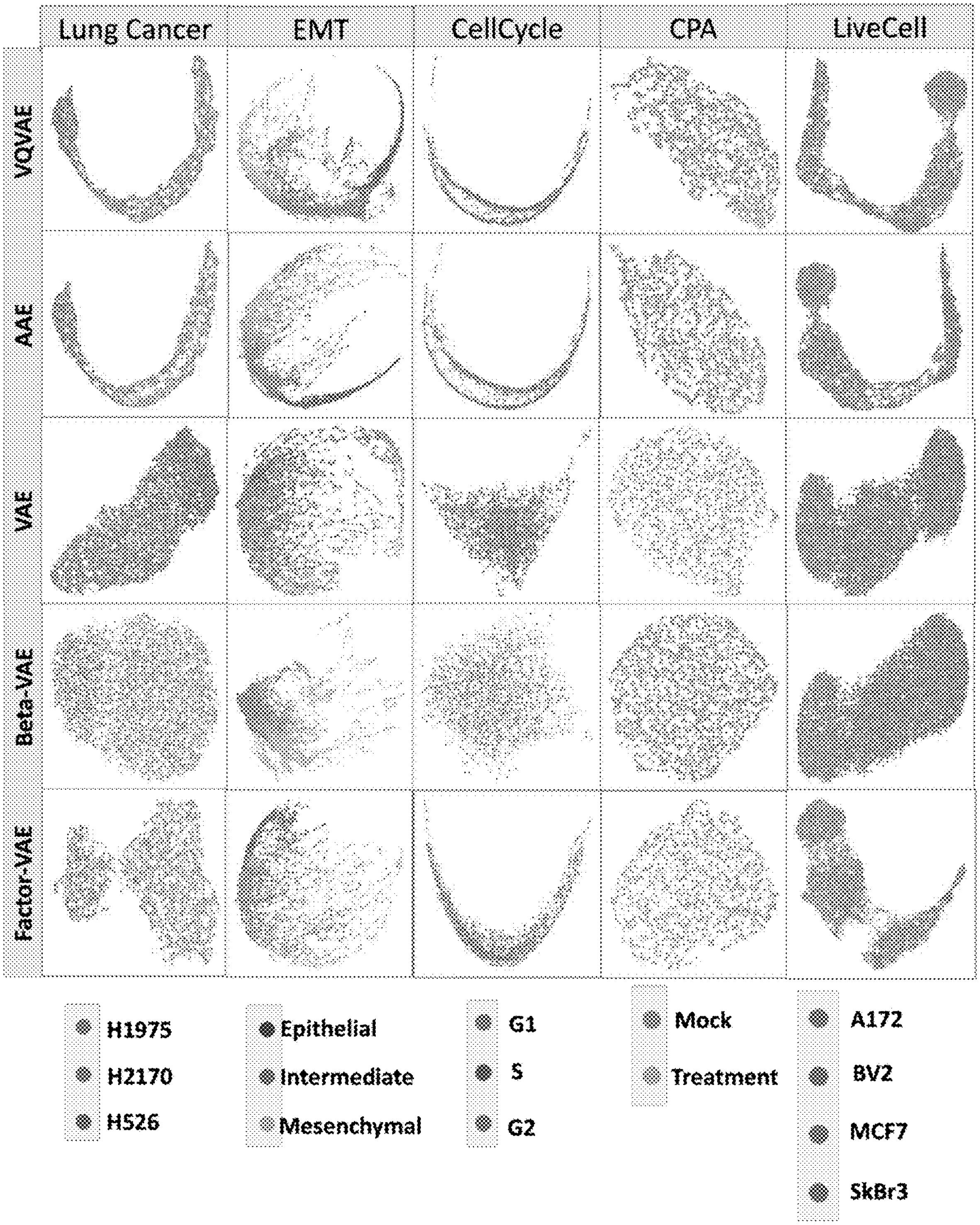
FIG. 18 depicts a two-dimensional representation of the latent space created using UMAP for five state-of-the-art autoencoders.

The 2D visualization of the latent space of 5 state of the art Autoencoders is compared in FIG. 18. The visualization indicates that factorVAE consistently outperforms the other disentangled VAE models across all datasets in downstream classification tasks. Considering both the quality of reconstructions and downstream analysis, FactorVAE appears to be a superior choice, thanks to its added advantage of having a disentangled representation, which is absent in VQ-VAE and AAE. Further comparison of the reconstruction performance of factorVAE with and without integrating ID-GAN for a range of $\gamma$ values, a hyperparameter used in training factorVAE, indicates significant improvement in reconstruction performance with ID-GAN integration compared to results obtained without ID-GAN.

Figure 4:
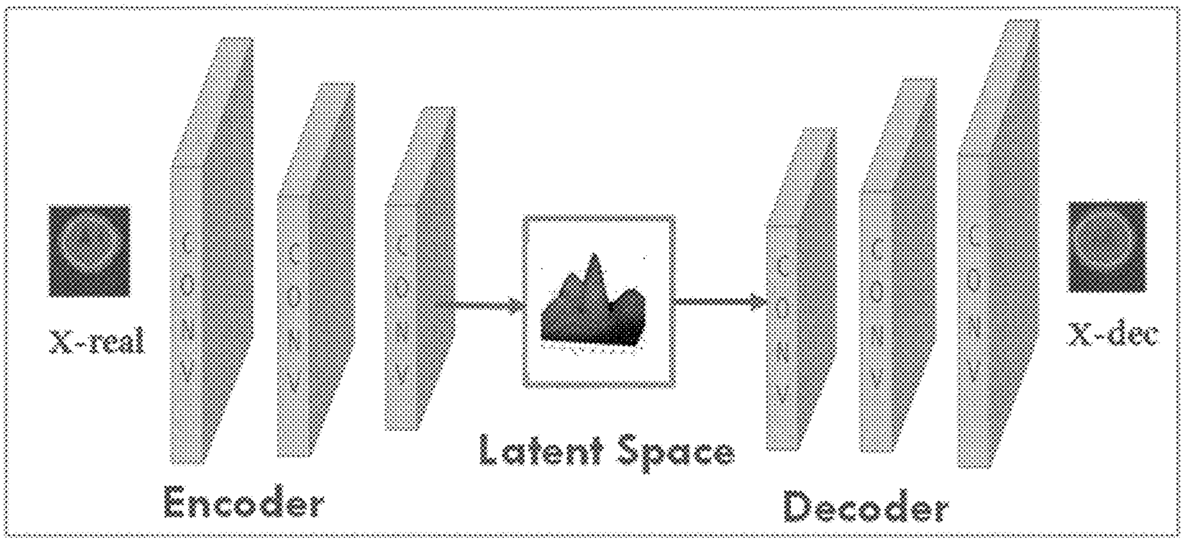
FIG. 4 depicts an exemplary dataset of Quantitative Phase Imaging (QPI) capturing cell cycle process for training the encoder and decoder of VAE network.
Figure 5:
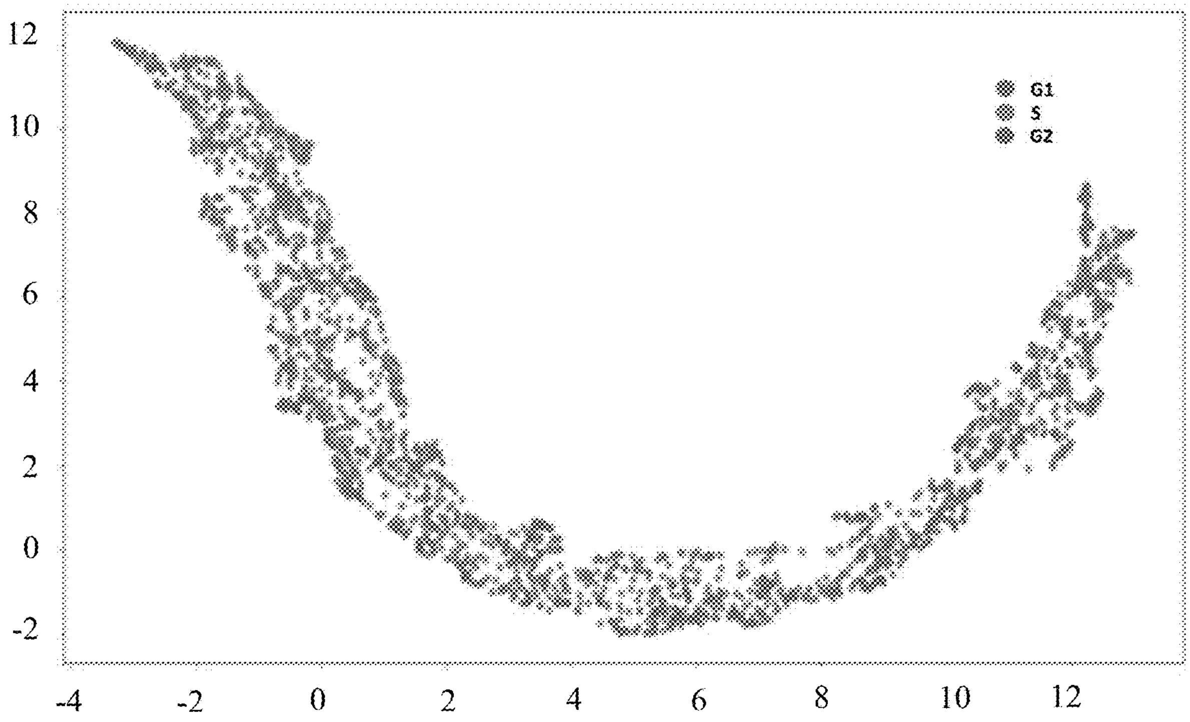
FIG. 5 depicts a downstream visualization of the learnt latent representation. An example dataset captured by QPI showing the cell cycle stages from G1 to S to G2.

Referring to FIG. 4, the VAE training includes training the encoder-decoder combination using an example dataset describing biological process of cell cycle progression; with states of the cell changing from G1 to S to G2. FIG. 5 is the downstream analysis of visualizing the latent space onto a 2-dimensional plot showing the cell cycle progression accurately. The morphologically similar cells will be mapped into closely spaced aggregates in the latent space and vice versa.

Further, the aggregated latent space can be visualized in two dimensional plots to understand underlying complex biological processes captured in the dataset. In general, the latent space driven downstream analysis can further be extended to do a trajectory inference to understand cell fate developing into bifurcating or multifurcating trajectories.

Figure 6:
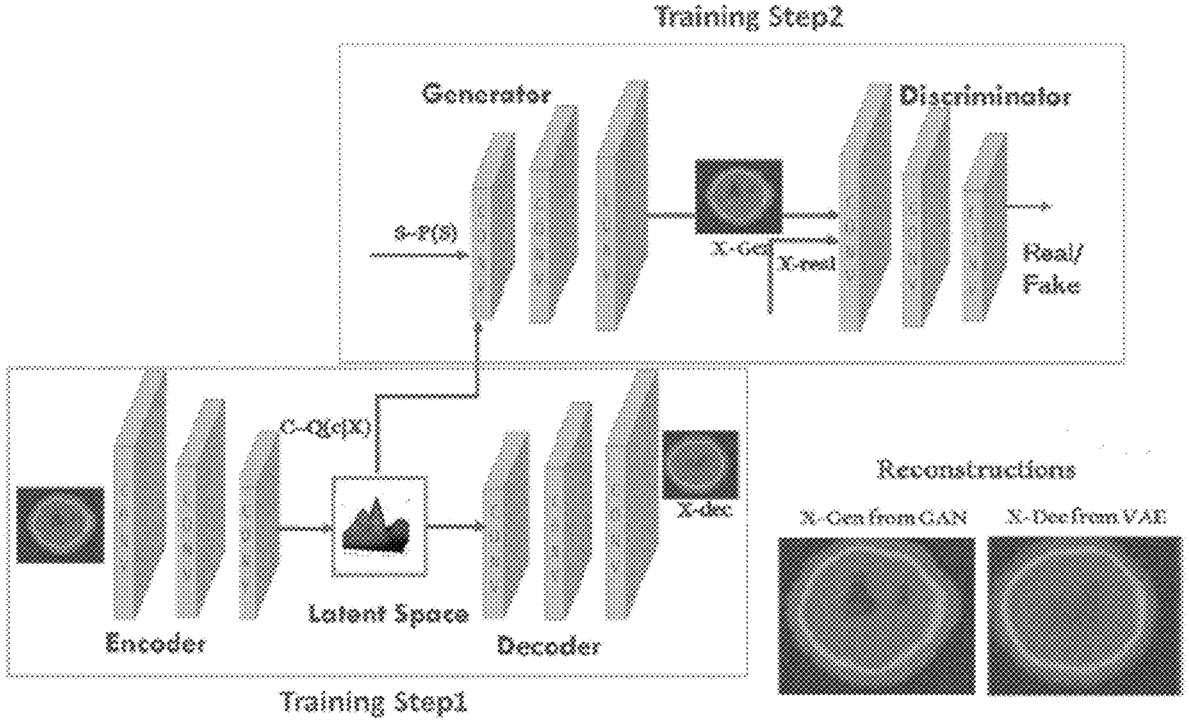
FIG. 6 depicts an exemplary dataset from QPI modality tested to generate realistic reconstruction (X-Gen) compared to lossy reconstructions from the autoencoder (X-Dec)

FIG. 6 shows the implementation of combination of two generative models (factor-VAE and GAN) and trained with Quantitative Phase Images to generate high quality reconstructions. High quality reconstructions aligned with varying latent dimensions enable interpretability by mapping latent features with manually extracted ones.

Hierarchical Feature Interpretability

Apart from being able to generate realistic images, the present method also includes a novel pipeline to provide logical explanation to the learnt representations of the VAE. This framework for interpretability of the learnt latent space includes:

- Generating images using the VAE-GAN configuration by varying each factor in the latent space at a time.
- Manually defined features extraction from generated realistic images from GAN.
- Hierarchical morphological mapping—the combined statistical variance analysis and hierarchical clustering to offer the interpretability of the learnt latent space.

Previous research has employed the VAEs to perform unsupervised learning on single-cell images, with the aim of predicting evolving cell states[15] and subsequent predictive tasks. In contrast, Dynamorph utilizes a VQVAE[22] for forecasting morphodynamic states of microglial cells. The representations acquired in Dynamorph are discrete latent representations, and traversals within the latent space are neither continuous nor disentangled. Furthermore, the work discusses interpreting the latent space, employing an indirect approach, and does not directly map the morphological features that the latent space has learned to the changing cell states.

In contrast to the prior researches[15,16,19-21,22], a novel technique is proposed for interpreting the learned representation by extracting handcrafted features from reconstructed images produced by latent traversals, facilitating the discovery of biologically meaningful inferences, especially the heterogeneities of cell types and lineages. A diverse set of single-cell features, based on hierarchical feature extraction, ranging from bulk and global textures to local textures, are extracted from the reconstructions obtained through latent dimension traversal to generate an "Interpretation heatmap" specific for every training session.

Figure 7:
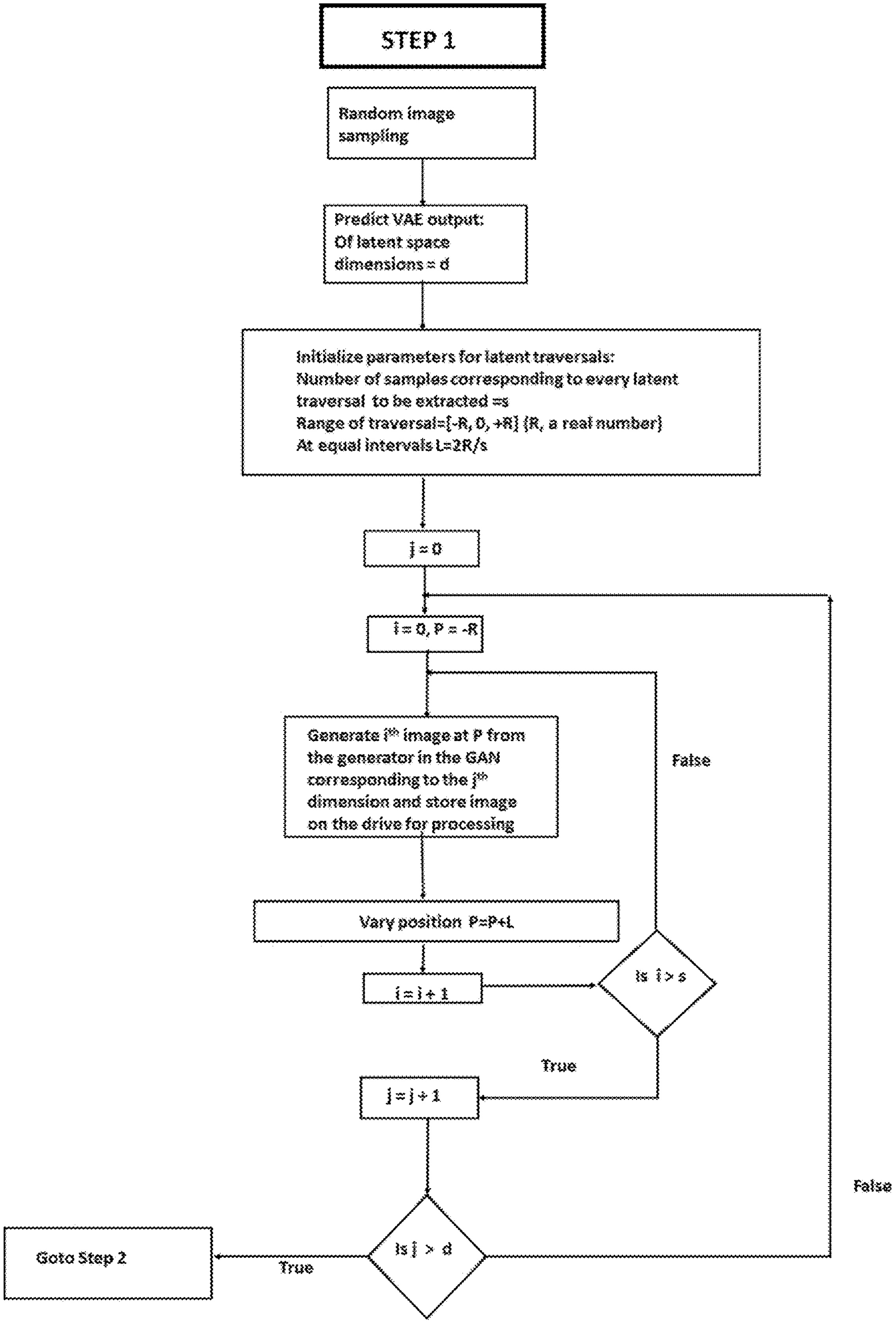
FIG. 7 depicts a flow diagram illustrating the framework for interpretability (STEP 1)

FIG. 7 is a framework for the disclosed method for interpretability using an exemplary Quantitative Phase Imaging dataset used for training the VAE as illustrated in FIG. 3 and FIG. 4. In Step 1, upon completion of the training, the latent space captures independent factors of variation, such as size, shape, orientation, density, texture, and brightness of the image dataset.

The latent space is considered disentangled if the VAE can learn independent factors of variation in each dimension of the latent space. If the latent space is perfectly disentangled, varying one dimension at a time results in the variation of only one factor in the generated image. In the case of a higher degree of disentanglement, the generated images from the GAN exhibit one factor varying as each dimension is traversed individually.

Figure 8:
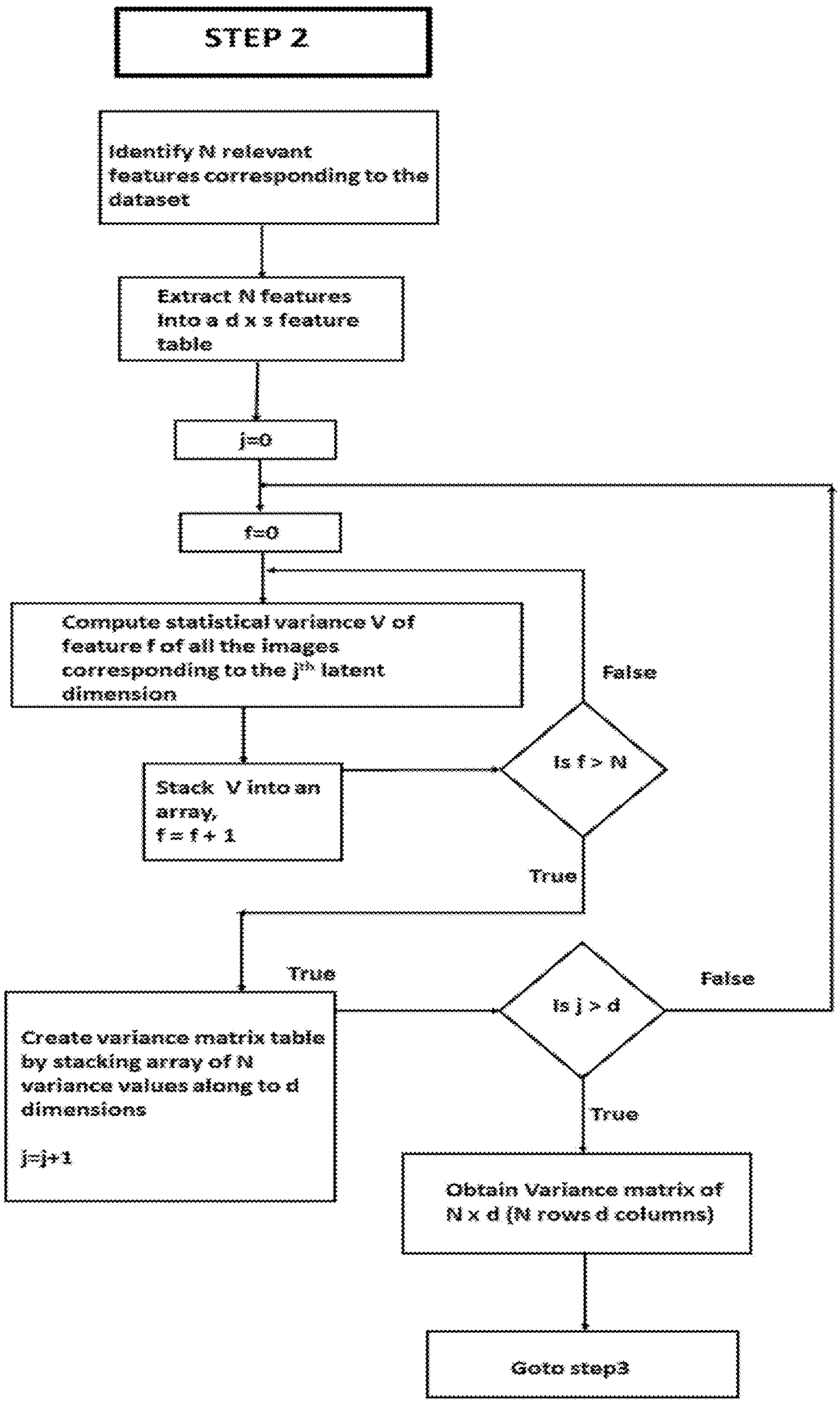
FIG. 8 depicts a flow diagram illustrating the framework for interpretability (STEP 2)

With this, N images are generated by traversing one dimension (variating in each dimension of the latent space), and N×d images are generated by traversing d dimensions. Referring to FIG. 8, in Step 2, the generated sets of latent traversal images can be further used to extract human-defined features, specifically for quantitative image datasets.

Around 40 features were defined by an expert with prior knowledge of the imaging modality. The features in this example are related to morphology, dry mass density, and local textures.

Statistical variance is computed for each feature for each set of images generated corresponding to traversal in every dimension.

Features extracted corresponding to traversal in each dimension is stacked into a feature table matrix. With features along rows and the latent space dimension along the columns.

Figure 9:
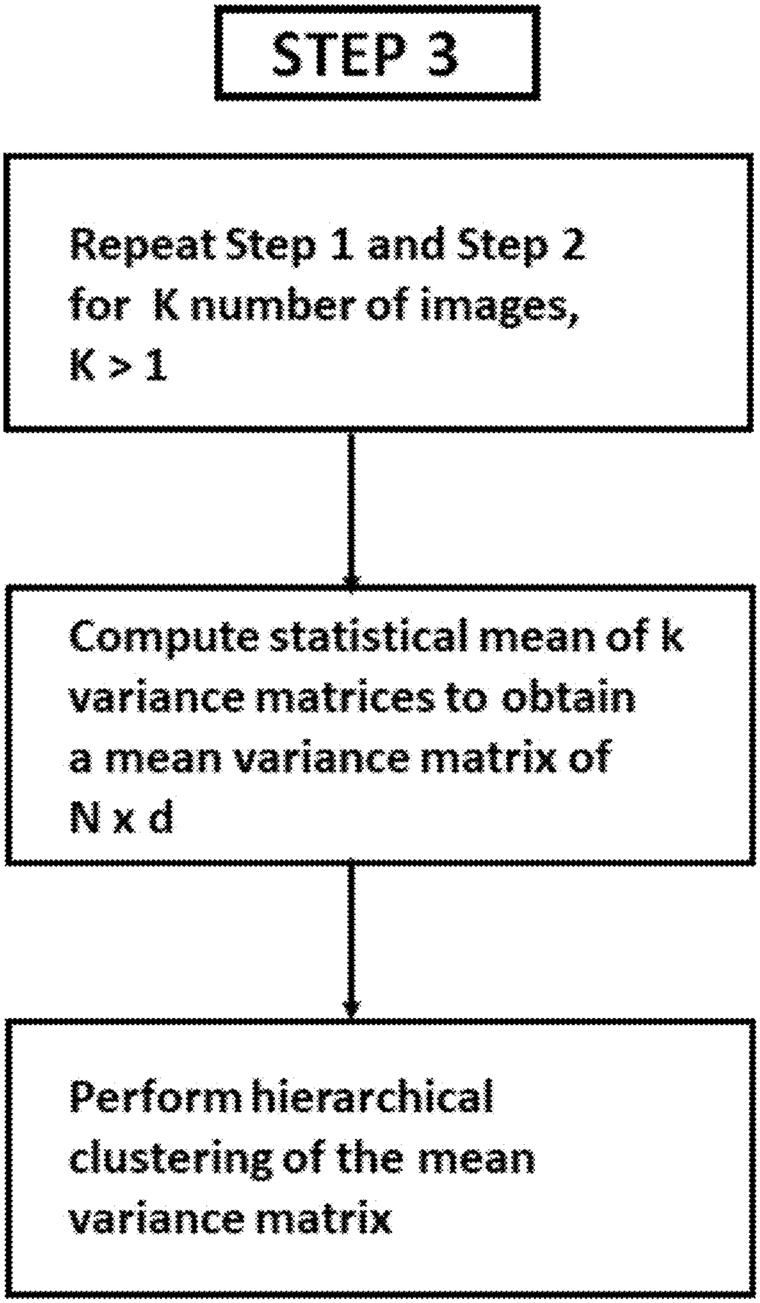
FIG. 9 depicts a flow diagram illustrating the framework for interpretability (STEP 3)

Referring to FIG. 9, in Step 3, for robust analysis, the above steps can be performed on many random samples and compute statistical mean to generate a mean-variance matrix.

Hierarchical clustering of the mean variance matrix gives rise to groupings which can be visualized in the form of a cluster map to understand the biophysical features learnt from the quantitative image dataset corresponding to the latent factors of the VAE.

Figure 10:
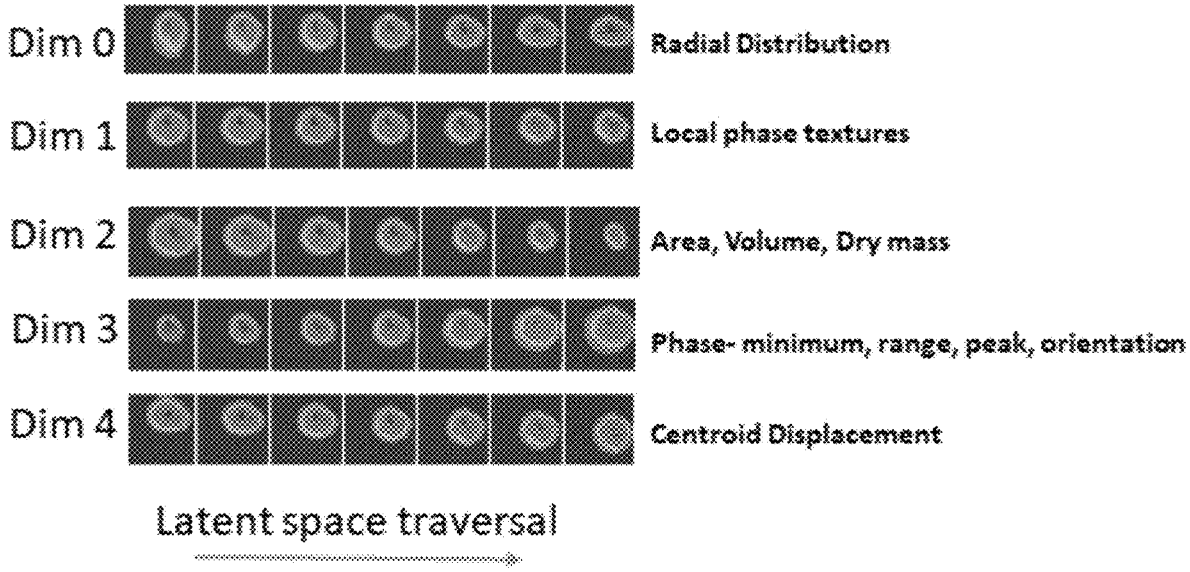
FIG. 10 depicts an example latent space traversal for latent space dimension sized 5 and corresponding realistic reconstructions using GAN.

FIG. 10 is an example N×d=7×5 images generated by traversing the latent space. The images generated can retain local texture information.

Figure 11:
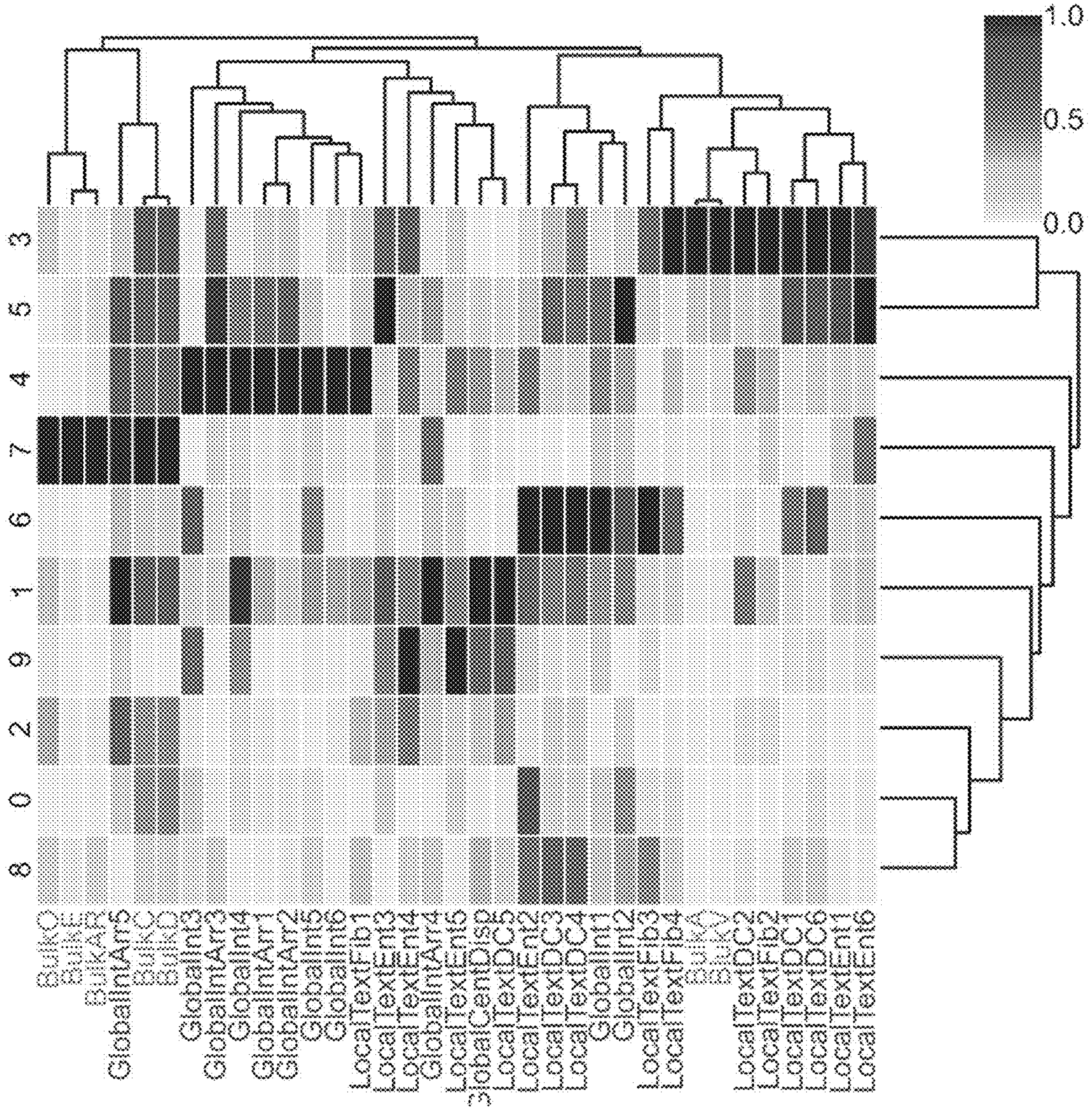
FIG. 11 depicts an example Interpretation Heatmap illustrating mapping of independent factors learnt that correspond to the set of manually defined correlated features across the latent space dimensions.

FIG. 11 is an example heat map obtained by hierarchical clustering of the mean-variance heat map. The heatmap shows the higher variance values grouped along the latent dimensions. The grouping of the features in each dimension are generally highly correlated.

Generalizability

One of the most significant applications of disentangled models is to generate observations from countless combinations of independent generative factors[21,25,26]. The present invention utilizes a disentangled latent space to assess generalizability in single-cell datasets. The method of the present invention is not only limited to classification task, but also trajectory inference task.

In one of the embodiments, it can analyze the unseen datasets from across various imaging modalities, and experimental conditions, promoting cross-study comparisons and reusable morphological profiling results. This generalization is possible based on the learnt latent factors in a manner like human intelligence. Human brain when learns the factor that helps the decision-making process in a situation, tries to use that factor for decision making in a new situation. For instance, when the brain knows that stale odour of a fruit can categorizes the fruit as rotten, it can as well generalize in a new situation when it encounters a different rotten fruit or food. The factor of variation here is 'odour'. When the brain learns multiple such factors, the decision making gets better and accurate.

In one embodiment, the model trained on the lung cancer dataset has been employed to predict the latent representation of the remaining dataset for downstream visualizations.

Figure 19:
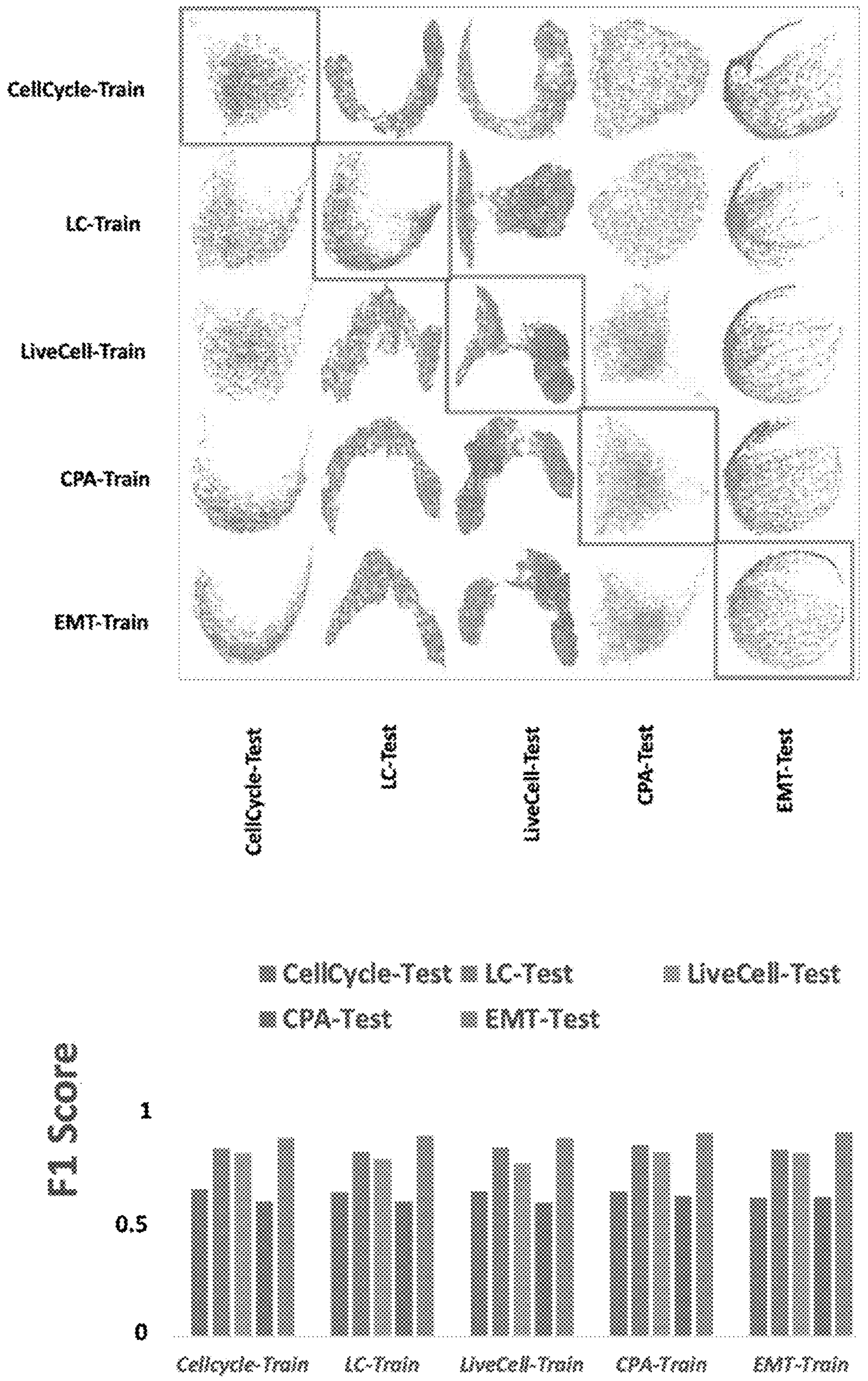
FIG. 19 depicts a qualitative 2D visualization trained on one dataset and subsequently tested on other datasets to predict biological cell states and progressions, and a quantitative classification based on F1 scores for generalizability tests.

FIG. 19 shows generalizability performance assessment of the framework. The pre-trained model can generalize from the insights learned in the form of disentangled representations to make predictions in new scenarios. Furthermore, for each of the four different datasets, there is a corresponding model displayed along the row. It is noteworthy that the five distinct models, each trained with different datasets, exhibit comparable visualizations when generalized, featuring similar global and local structures in the UMAP and Phate[27, 28] visualizations.

Figure 12:
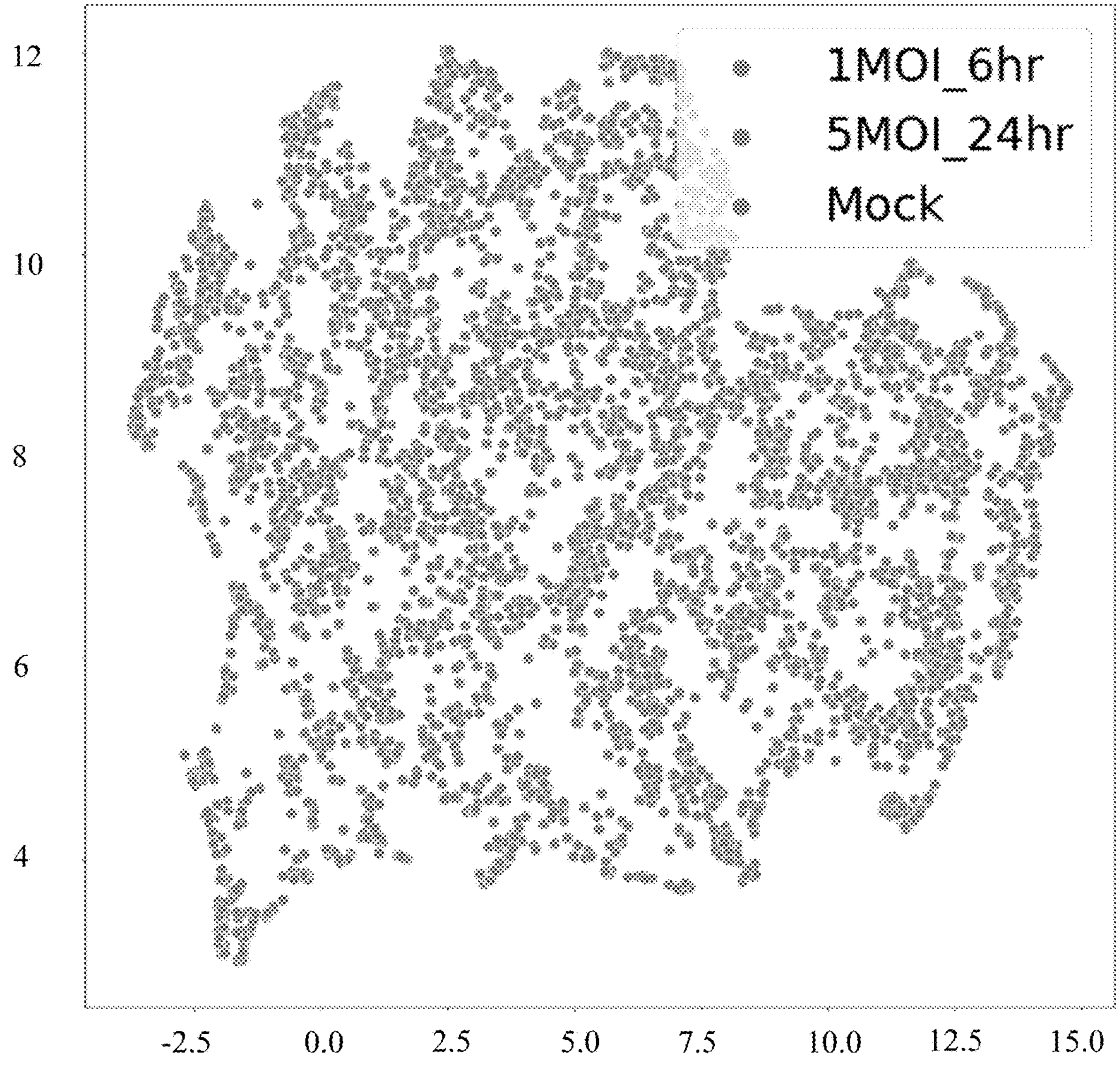
FIG. 12 depicts generalizations for downstream visualization of an example dataset captured by another QPI modality (different from the training dataset) showing the heterogeneity in the dataset including un-infected cell population, and different levels of SARS-CoV infections. Mock being the uninfected cell population. 1MOI_6 hr and 5MOI_24 hr correspond to the infected population at different Multiplicity of Infections (MOI) at 6 and 24 hours.
Figure 13:
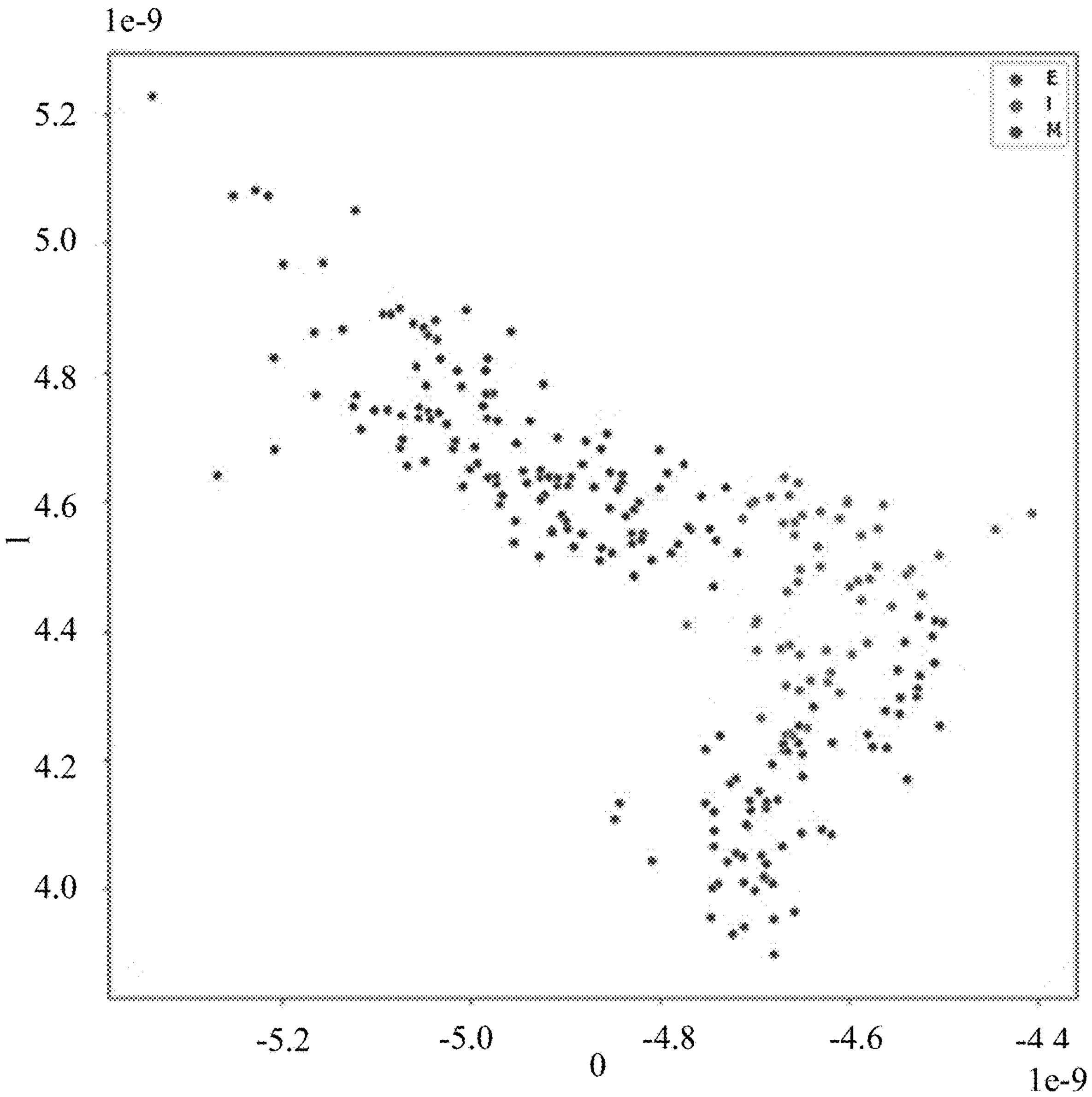
FIG. 13 depicts generalizations for downstream visualization of an example dataset captured by fluorescence imaging showing transition of cell states from Epithelial 'E' to Mesenchymal 'M' via an intermediate transitory state "I"

FIG. 12 is an example of the model's ability to generalize to different datasets obtained from the same image contrast but across different modalities. For instance, it can use the model trained with QPI dataset from Microscope 1 to generalize to a new biological process captured in a QPI image dataset from Microscope 2. Additionally, it can generalize to datasets with different image contrasts and various imaging modalities, such as training with QPI imaging data and testing its generalizability with fluorescence microscope data, as shown in an example of generalized downstream visualization in FIG. 13. This is similar to the kind of generalizations human brain does to make decisions in a new unseen situation based on a previously seen situation.

Figure 14:
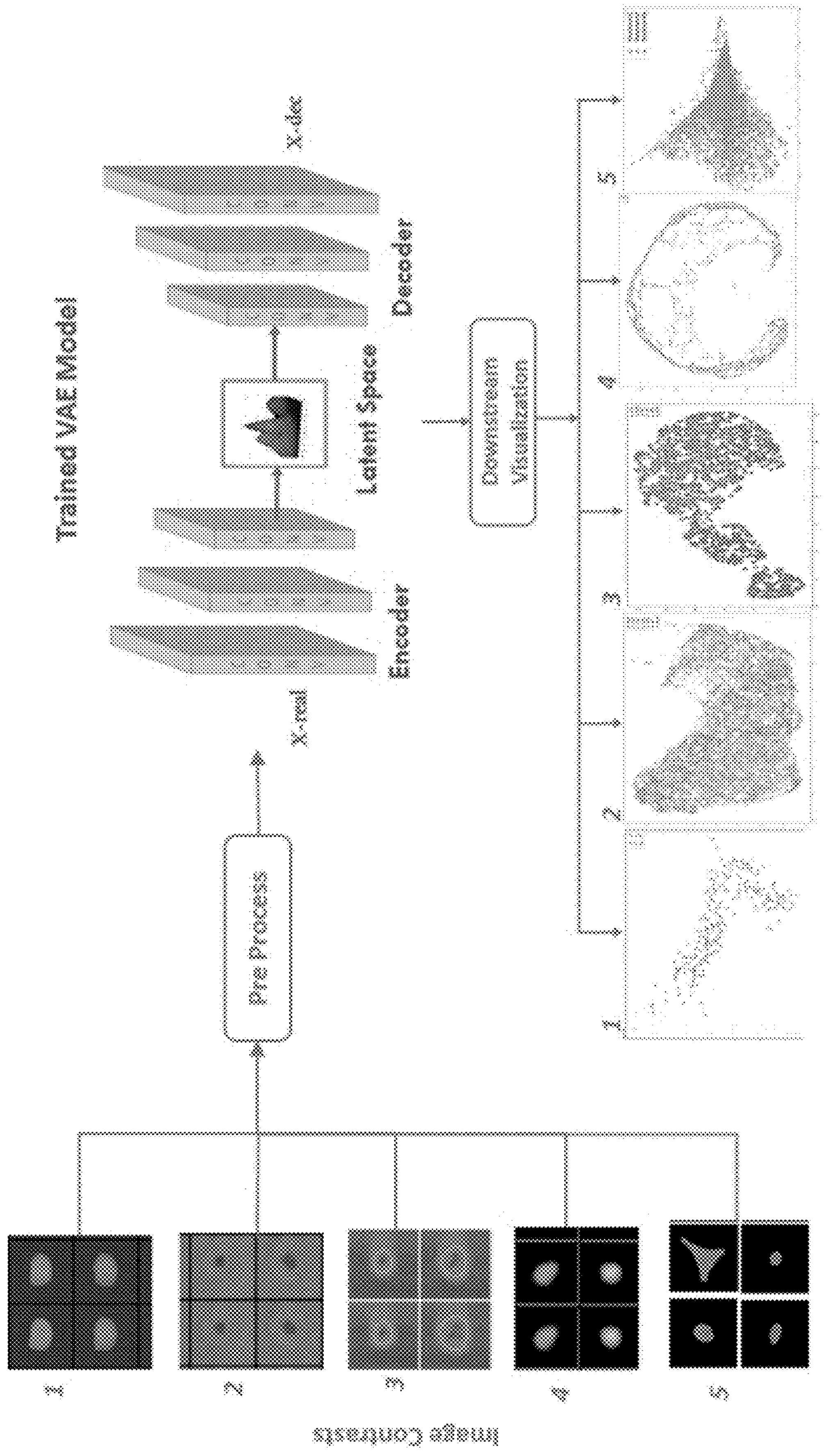
FIG. 14 depicts a graphical overview of generalizability test. An example showing the generalizations made by the trained model to reveal biological processes captured from a range of imaging modalities (QPI, Fluorescence, Phase Contrast, Bright field) for biological.

FIG. 14 provides a general example of a generalizability test. Various biological processes from various contrasts, to which the trained model has not been exposed, can be used to accurately interpret and reproduce downstream analysis results meaningfully.

The present invention has a capacity to explain predictions on test datasets without necessitating model retraining.

EXAMPLE

Example 1—Materials

Computing Environment

As mentioned, advantageously, the techniques described herein could be applied to any device and/or network where data analysis was performed. The general-purpose remote computer described below in FIG. 15 was just one example, and the disclosed subject matter could be implemented with any client having network/bus interoperability and interaction. Thus, the disclosed subject matter could be implemented in an environment of networked hosted services in which very few or minimal client resources were implicated, e.g., a networked environment in which the client device served merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

Figure 15:
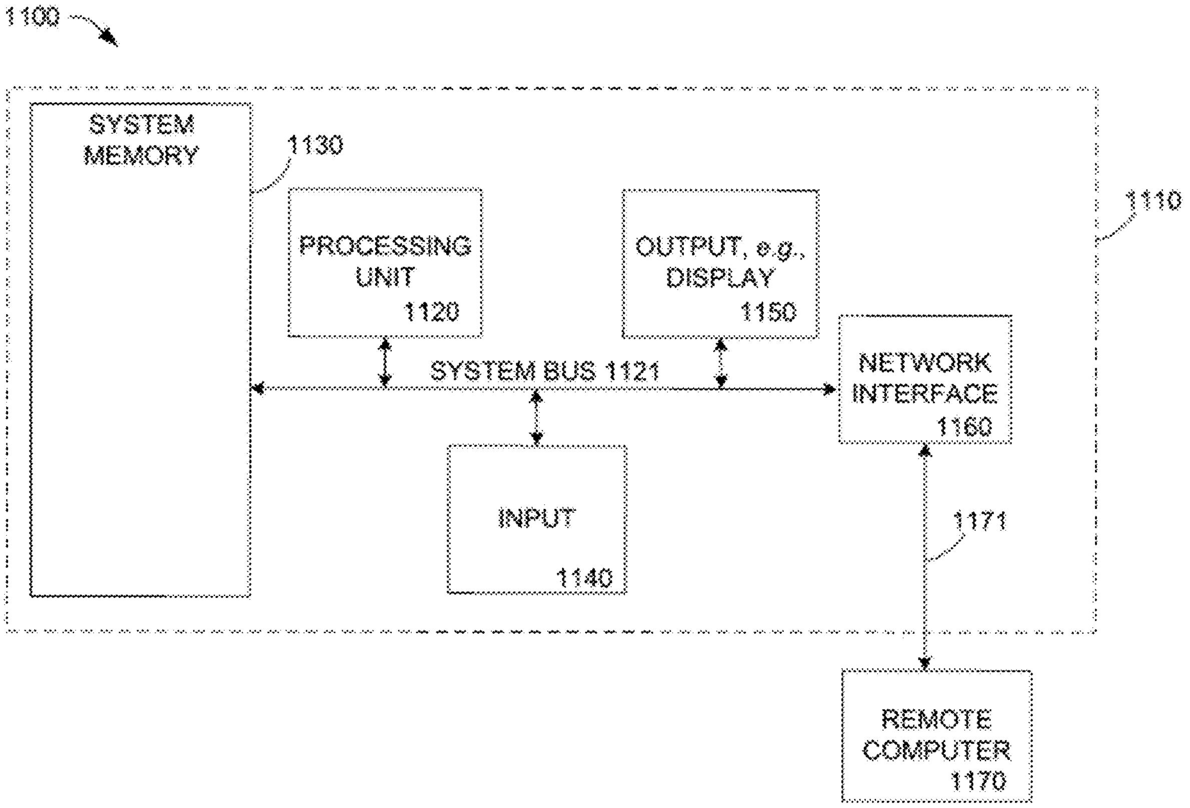
FIG. 15 illustrates a block diagram of an example electronic computing environment that can be implemented in conjunction with one or more aspects described herein.

FIG. 15 thus illustrated an example of a suitable computing system environment 1100 in which some aspects of the disclosed subject matter could be implemented, although as made clear above, the computing system environment 1100 was only one example of a suitable computing environment for a device and was not intended to suggest any limitation as to the scope of use or functionality of the disclosed subject matter. Neither should the computing environment 1100 be interpreted as having any dependency or requirement relating to any one or combination of components illustrated in the exemplary operating environment 1100.

With reference to FIG. 15, an exemplary device for implementing the disclosed subject matter included a general-purpose computing device in the form of a computer 1110. Components of the computer 1110 included, but were not limited to, a processing unit 1120, a system memory 1130, and a system bus 1121 that coupled various system components, including the system memory, to the processing unit 1120. The system bus 1121 could have been any of several types of bus structures, including a memory bus or memory controller, a peripheral bus, and a local bus using any of a variety of bus architectures.

Computer 1110 typically included a variety of computer-readable media. Computer-readable media could have been any available media that could have been accessed by computer 1110. By way of example, and not limitation, computer-readable media could have comprised computer storage media and communication media. Computer storage media included volatile and nonvolatile, removable and non-removable media implemented in any method or technology for the storage of information, such as computer-readable instructions, data structures, program modules, or other data. Computer storage media included, but was not limited to, RAM, ROM, EEPROM, flash memory, or other memory technology, CD-ROMs, digital versatile disks (DVDs), or other optical disk storage, magnetic cassettes, magnetic tape, magnetic disk storage, or other magnetic storage devices, or any other medium that could have been used to store the desired information and that could have been accessed by computer 1110. Communication media typically embodied computer-readable instructions, data structures, program modules, or other data in a modulated data signal, such as a carrier wave or other transport mechanism, and included any information delivery media.

The system memory 1130 may include computer storage media in the form of volatile and/or nonvolatile memory, such as read-only memory (ROM) and/or random-access memory (RAM). A basic input/output system (BIOS), containing the basic routines that helped transfer information between elements within computer 1110, such as during start-up, was stored in memory 1130. Memory 1130 typically also contained data and/or program modules that were immediately accessible to and/or presently being operated on by processing unit 1120. By way of example, and not limitation, memory 1130 might have also included an operating system, application programs, other program modules, and program data.

The computer 1110 also included other removable/non-removable, volatile/nonvolatile computer storage media. For example, the computer 1110 could have included a hard disk drive that read from or wrote to non-removable, nonvolatile magnetic media, a magnetic disk drive that read from or wrote to a removable, nonvolatile magnetic disk, and/or an optical disk drive that read from or wrote to a removable, nonvolatile optical disk, such as a CD-ROM or other optical media. Other removable/non-removable, volatile/nonvolatile computer storage media that could have been used in the exemplary operating environment included, but were not limited to, magnetic tape cassettes, flash memory cards, digital versatile disks, digital video tape, solid-state RAM, solid-state ROM, and the like. A hard disk drive was typically connected to the system bus 1121 through a non-removable memory interface, such as an interface, and a magnetic disk drive or optical disk drive was typically connected to the system bus 1121 by a removable memory interface, such as an interface.

A user could enter commands and information into the computer 1110 through input devices such as a keyboard and pointing device, commonly referred to as a mouse, trackball, or touchpad. Other input devices could have included a microphone, joystick, gamepad, satellite dish, scanner, wireless device keypad, voice commands, or the like. These and other input devices were often connected to the processing unit 1120 through user input 1140 and associated interfaces that were coupled to the system bus 1121, but could have been connected by other interface and bus structures, such as a parallel port, game port, or a universal serial bus (USB). A graphics subsystem could have also been connected to the system bus 1121. A projection unit in a projection display device or a HUD in a viewing device or another type of display device could have also been connected to the system bus 1121 via an interface, such as output interface 1150, which might have in turn communicated with video memory. In addition to a monitor, computers could have also included other peripheral output devices such as speakers, which could have been connected through output interface 1150.

The computer 1110 could have operated in a networked or distributed environment using logical connections to one or more other remote computers, such as remote computer 1170, which could have in turn had media capabilities different from device 1110. The remote computer 1170 could have been a personal computer, a server, a router, a network PC, a peer device, personal digital assistant (PDA), cell phone, handheld computing device, a projection display device, a viewing device, or another common network node, or any other remote media consumption or transmission device, and could have included any or all of the elements described above relative to the computer 1110. The logical connections depicted in FIG. 15 included a network 1171, such as a local area network (LAN) or a wide area network (WAN), but could have also included other networks/buses, either wired or wireless. Such networking environments were commonplace in homes, offices, enterprise-wide computer networks, intranets, and the Internet.

When used in a LAN networking environment, the computer 1110 could be connected to the LAN 1171 through a network interface or adapter. When used in a WAN networking environment, the computer 1110 typically included a communications component, such as a modem, or other means for establishing communications over the WAN, such as the Internet. A communications component, such as a wireless communications component, a modem, and so on, which could have been internal or external, could have been connected to the system bus 1121 via the user input interface of input 1140 or another appropriate mechanism. In a networked environment, program modules depicted relative to the computer 1110, or portions thereof, could have been stored in a remote memory storage device. It was appreciated that the network connections shown and described were exemplary, and other means of establishing a communications link between the computers could have been used.

Networking Environment

Figure 16:
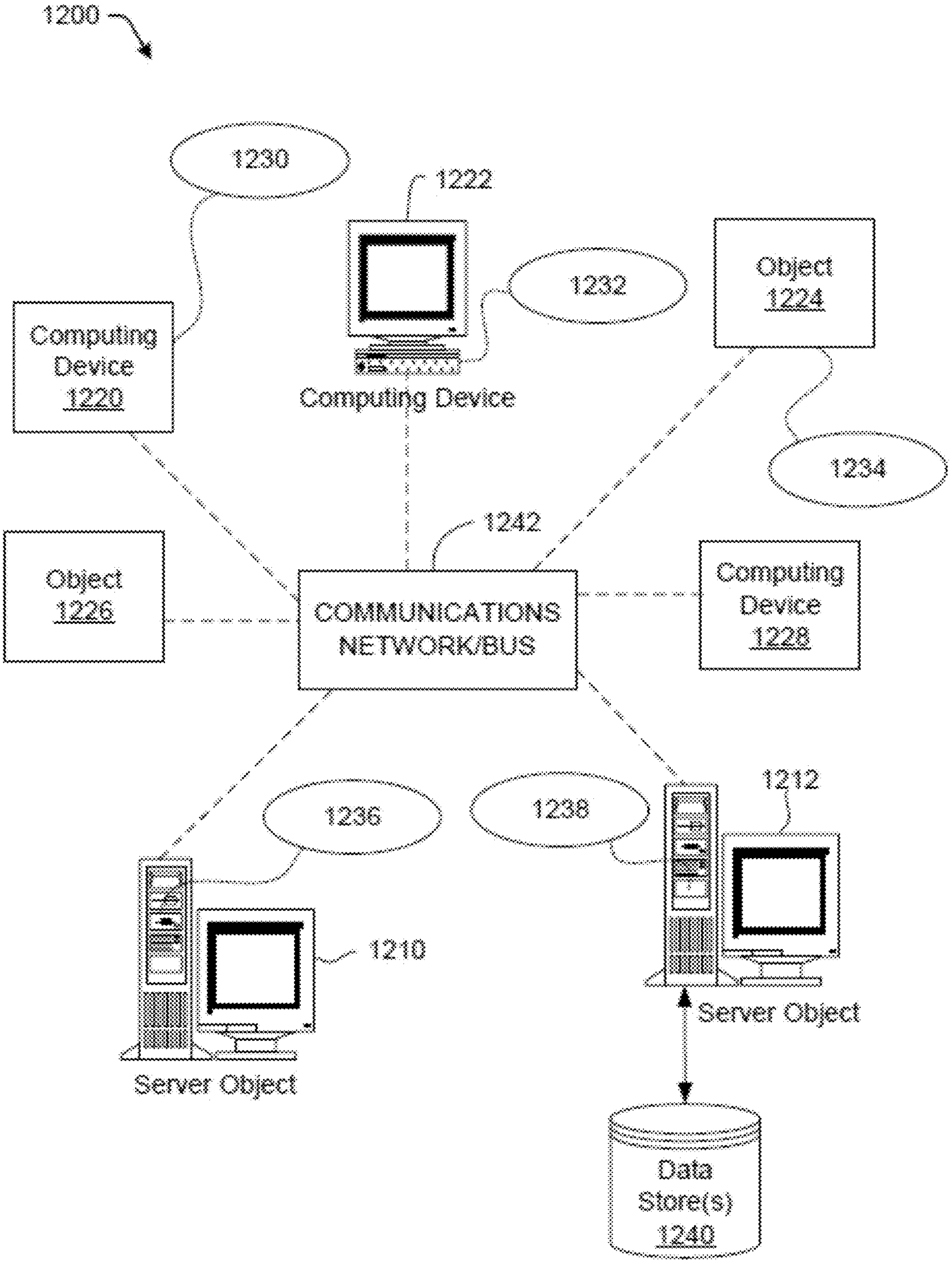
FIG. 16 depicts a block diagram of an example data communication network that can be operable in conjunction with various aspects described herein.

FIG. 16 provided a schematic diagram of an exemplary networked or distributed computing environment 1200. The distributed computing environment comprised computing objects 1210, 1212, etc., and computing objects or devices 1220, 1222, 1224, 1226, 1228, etc., which could have included programs, methods, data stores, programmable logic, etc., as represented by applications 1230, 1232, 1234, 1236, 1238, and data store(s) 1240. It was appreciated that computing objects 1210, 1212, etc., and computing objects or devices 1220, 1222, 1224, 1226, 1228, etc., could have comprised different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1240 could include one or more cache memories, one or more registers, or other similar data stores.

Each computing object 1210, 1212, etc., and computing objects or devices 1220, 1222, 1224, 1226, 1228, etc., could have communicated with one or more other computing objects 1210, 1212, etc., and computing objects or devices 1220, 1222, 1224, 1226, 1228, etc., by way of the communications network 1242, either directly or indirectly. Even though it was illustrated as a single element in FIG. 16, communications network 1242 could have comprised other computing objects and computing devices that provided services to the system of FIG. 16 and/or could have represented multiple interconnected networks, which were not shown. Each computing object 1210, 1212, etc., or computing object or devices 1220, 1222, 1224, 1226, 1228, etc., could have also contained an application, such as applications 1230, 1232, 1234, 1236, 1238, that might have made use of an API or other object, software, firmware, and/or hardware suitable for communication with or implementation of the techniques and disclosure described herein.

There were a variety of systems, components, and network configurations that supported distributed computing environments. For example, computing systems could have been connected together by wired or wireless systems, by local networks or widely distributed networks. Currently, many networks were coupled to the Internet, which provided an infrastructure for widely distributed computing and encompassed many different networks, though any network infrastructure could have been used for exemplary communications made incident to the systems' automatic diagnostic data collection, as described in various embodiments herein.

Thus, a host of network topologies and network infrastructures, such as client/server, peer-to-peer, or hybrid architectures, could have been utilized. The 'client' was a member of a class or group that used the services of another class or group to which it was not related. A client could have been a process, i.e., roughly a set of instructions or tasks, that requested a service provided by another program or process. The client process utilized the requested service, in some cases without having to 'know' any working details about the other program or the service itself.

In a client/server architecture, particularly in a networked system, a client was usually a computer that accessed shared network resources provided by another computer, e.g., a server. In the illustration of FIG. 16, as a non-limiting example, computing objects or devices 1220, 1222, 1224, 1226, 1228, etc., could have been thought of as clients, and computing objects 1210, 1212, etc., could have been thought of as servers, where computing objects 1210, 1212, etc., acting as servers provided data services, such as receiving data from client computing objects or devices 1220, 1222, 1224, 1226, 1228, etc., storing data, processing data, transmitting data to client computing objects or devices 1220, 1222, 1224, 1226, 1228, etc., although any computer could have been considered a client, a server, or both, depending on the circumstances.

A server was typically a remote computer system accessible over a remote or local network, such as the Internet or wireless network infrastructures. The client process could have been active in a first computer system, and the server process could have been active in a second computer system, communicating with one another over a communications medium, thus providing distributed functionality and allowing multiple clients to take advantage of the information-gathering capabilities of the server. Any software objects utilized pursuant to the techniques described herein could have been provided standalone or distributed across multiple computing devices or objects.

In a network environment in which the communications network 1242 or bus was the Internet, for example, the computing objects 1210, 1212, etc., could have been Web servers with which other computing objects or devices 1220, 1222, 1224, 1226, 1228, etc., communicated via any of a number of known protocols, such as the hypertext transfer protocol (HTTP). Computing objects 1210, 1212, etc., acting as servers, could have also served as clients, e.g., computing objects or devices 1220, 1222, 1224, 1226, 1228, etc., as may have been characteristic of a distributed computing environment.

Example 2—Disentangled Representation Learning

Variational Auto Encoder (VAE)

The encoder maps the input data to a distribution in the latent space which is a gaussian distribution. Encoder learns to approximate parameters of the d dimensional latent distribution which is represented as a posterior approximation according to Bayesian rule:

$$z \sim P_e(x_i) = N(z_i, \mu_i, \sigma^2) \quad (1)$$

The decoder samples the variable z from $z \sim P_e(x_i)$ to generate the observed data point x, which is given by:

$$x \sim P_d(z) \quad (2)$$

Dataset consisting of N discrete or continuous variables x:

$$X = \{x^i\}\ i = 1 \ldots N \quad (3)$$

Assuming the data X is generated by continuous hidden representation z, by formulating a generative model:

$$Xe \rightarrow Zd \rightarrow X' \quad (4)$$

The value of z is defined by a prior distribution P(z) and x is generated from a conditional distribution P(x|z). The generative model d is to approximate x that resembles real data from z, for which parameters 'd' of generative model and latent z is to be identified. Marginal likelihood is composed of sum of individual likelihood of points x given by:

$$\log P_d\left(x^{(1)} \ldots\ x^{(N)}\right) = \sum_{i=1}^{N} \log P_d\left(x^{(i)}\right) \tag{5}$$

The above two approximations are optimized jointly by a single objective function:

$$L(d,e;x^{(i)}) = -D_{KL}[q_e(x^{(i)}) \| P(z)] + E_{q_e}(z|x)[\log\ P_d(x^{(i)}|z)] \tag{6}$$

The above term of the LHS is optimized and differentiated to estimate the variational parameters 'e', and the generative parameters 'd'. However, it is practically infeasible to estimate the parameter e as it is not differentiable which is overcome by reparameterization trick.

Standard VAE can be extended with an additional hyper-parameter β. β-VAE is deigned to achieve a disentangled latent representation by controlling beta. When β=1 it represents a standard VAE and varying β>1 improves disentanglement at the cost of data reconstruction. However higher values of beta allow interpretation of the latent space by varying dimensions[54].

$$L(d,e;x^{(i)},\beta) = -\beta * D_{KL}[q_e(x^{(i)}) | P(z)] + E_{q_{e(z|x)}}[\log\ P_d(x^{i} |z)] \tag{7}$$

FactorVAE

The drawback of reconstruction vs disentanglemet tradeoff is addressed by separating the terms of KL divergence in (3) has the KL term decomposed in to Mutual Information I(z,x) and penalizing the KL term here, which is independent of the information of x, retains good reconstruction inspite of higher pressure for disentanglement. The objective function now for Factor VAE is given by the following formula is expresses as total is intractable:

$$L(d,e;x^{(i)},\beta) = -\beta * D_{KL}(q_e(x) | P_d(z)) - D_{KL}(q(z) \| \underline{q}(z)) \tag{8}$$

To overcome this, Factor VAE uses a density ratio trick by training a classifier or discriminator to approximate the density ratio in the KL term. The MLP discriminator is trained jointly with the VAE. Hence Factor VAE achieves better reconstruction at higher degrees of disentanglement.

$$D_{KL}\left(q(z) \| \underline{q}(z)\right) = E_{q_e(z)} \log\left[\frac{q(z)}{\underline{q}(z)}\right] \tag{9}$$

ID-GAN

The ID-GAN methodology efficiently separates the disentanglement and high-fidelity generation objectives into distinct training steps, ultimately leading to improved image generation quality while retaining meaningful disentangled representations. The formulation of the optimization of the joint objective function is given by:

$$R_{ID\text{-}GAN}(D,G) = L_{GAN}(D,G) - \lambda R_{Distill}(G) \tag{10}$$

Aligning the reconstruction of GAN with the disentangled representation is achieved by maximizing the information between the disentangled latent representation and the generator output corresponding to the latent representation. $L_{GAN}(D,G)$ is optimized in an adversarial manner for discriminator to classify a real vs fake image and generator to improve image generation from the random noise and $R_{Distill}$ (G) term jointly maximizes the mutual information between the latent variable c Example 3—Interpretation Heatmap The latent dimension effectively encoded information about cell features within its disentangled dimensions. By traversing the latent space and reconstructing images, variations in the features encoded within the latent dimension could be observed. Quantitatively assessing various features across a wide category and understanding the dimensions encoding distinct cellular information became feasible.

A total of 35 features from the latent traversal images were extracted, encompassing bulk, global, and local characteristics. The chosen latent space dimension was 10, and for each latent traversal, reconstruction was performed at 10 points. Statistical variance for each feature across these 10 reconstructions in the traversal was calculated, resulting in a 1×35 vector. Each vector corresponded to the variance values of 35 features for a single latent dimension. This process was repeated for all latent dimensions, generating 10 such 1×35 vectors. These vectors were then stacked to create a 10×35 matrix, which was subjected to hierarchical clustering. The clustered heatmap was called the "Interpretation Heatmap".

The heatmap was used in two scenarios: (1) when assessing the predictions made by the trained model on the training dataset; and (2) when the same trained model was applied to new datasets to generalize.

The interpretation heatmap specific to the training dataset provided valuable insights into the encoded features and their variations within the disentangled latent space, aiding in the understanding of model predictions and generalization capabilities. The features exhibiting higher variance values spotlighted the factors of variation tied to the encoded latent dimension. Such an approach helped understand the specific attributes that contributed significantly to the variations within the latent space.

Example 4—Performance Metrics

Disentanglement Metric Score

Regarding to the disentanglement Metric score, various methods for measuring disentanglement had been proposed in previous studies[19,20,33]. Both Beta and factor VAE metrics followed a supervised approach in which the annotations of the factors of variation in a dataset were predefined. However, in practical real-world datasets where annotations were unknown, unsupervised disentanglement metrics became necessary. An ensemble of supervised disentanglement metrics was performed and tested on a large number of datasets, disentanglement models, and metrics. Another study explained how, when using different disentanglement metrics, the scores were uncorrelated on the same datasets[26, 34]. The present invention provides a new method to measure disentanglement specific to single cell image datasets. The assumption was that the generative factors for single-cell datasets fell broadly under the hierarchical attributes of bulk, global, and local. The methodology involved creating an interpretation heatmap that incorporated the variance values of all bulk, local, and global features to calculate the disentanglement score. In the case of a perfectly disentangled model, where all three generative factors were separated into distinct latent dimensions, the score would be 1. Conversely, an entangled model would produce a score closer to 0. The computation of the mean variance values in a latent dimension for all features separately, with respect to the three generative factors (bulk, global, or local), indicated the extent of each generative factor within that dimension. An entangled model was identified if two factors with the maximum mean values corresponded to the same latent dimension, resulting in lower scores. The steps for computing the metric score were explained in the methods section. The metric score could have been further improved with the interpretation heatmap to conduct a more in-depth interpretation of the disentangled latent space. However, it's worth noting that the different aspects within the category of local generative factors were not considered.

Figure 20:
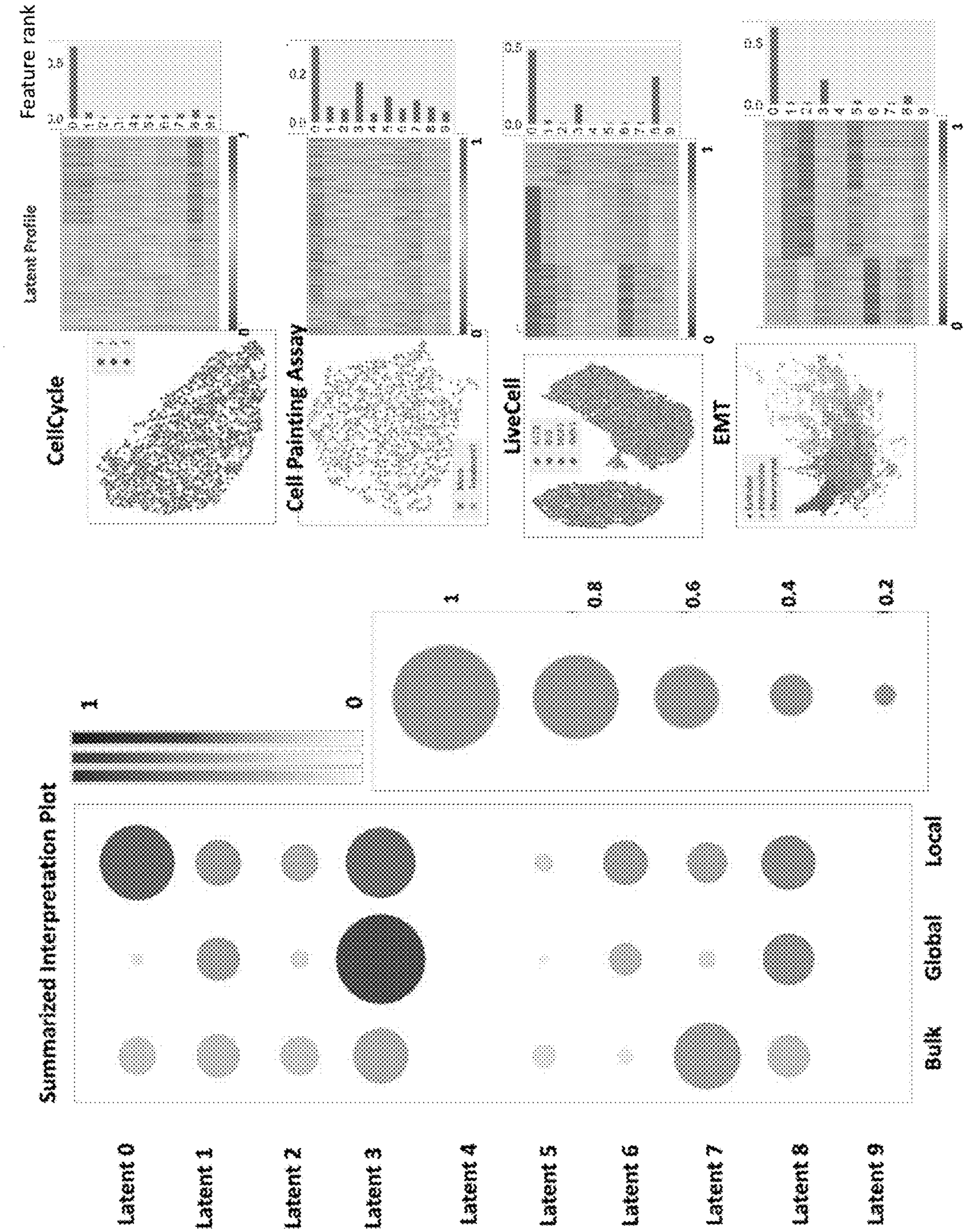
FIG. 20 depicts a bubble plot where dimensions 0, 3, and 7 corresponded to maximum variations in Local, Global, and Bulk features, respectively.

The summarized interpretation bubble plot was generated based on the interpretation heatmap. The aspect of explainability in the framework was demonstrated in FIG. 20. The feature ranking of the predicted latent explained the important latent factors, and the interpretable heatmap generated from the training dataset provided answers regarding the critical factors on which the model had based its decisions. Latent dimension 0 consistently ranked higher in most of the generalized predictions, which meant that bulk features had contributed to the models in generalizing to unseen datasets such as cell cycle, cell painting assays, LiveCell, and EMT. From the summarized interpretation plot, dimensions 0, 3, and 7 corresponded to maximum variations in Local, Global, and Bulk features, respectively. The feature ranking of the predicted latent explained the important latent factors, and the interpretable heatmap generated from the training dataset provided answers regarding the critical factors on which the model based its decisions. Latent dimension 0 consistently ranked higher in most of the generalized predictions, indicating that bulk features played a significant role in the model's ability to generalize to unseen datasets such as cell cycle, cell painting assays, LiveCell, and EMT.

Mean Squared Error (MSE) is the square of the difference between actual and the predicted values. Where for images, y and ŷ being the values of the real image and the generated image. N, total number of pixels in the image. MSE is computed using:

$$MSE = \frac{1}{N}\sum(y - \hat{y})^2 \quad (11)$$

Fréchet inception distance (FID) is a metric for quantifying the extent of the realness of images generated by generative adversarial networks (GANs). Distance measure indicates the closeness of the generated distribution to the real distribution. Smaller the value of FID measured between the two distributions, better is the model's image generation performance.

Classification Accuracy

F1 score is computed to measure the classification accuracy of the model based on the true positive (TP), False positive (FP) and False Negative Values from the confusion matrix generated by training the tree based decision classifier based on decision tree:

$$F1 = \frac{2 * \text{precision} * \text{recall}}{\text{precision} + \text{recall}} \quad (12)$$

$$\text{precision} = \frac{TP}{TP + FP} \quad (13)$$

$$\text{recall} = \frac{TP}{TP + FN} \quad (14)$$

SSIM

Stands for Structural Similarity is a metric used to measure similarity between two images in terms of luminance, contrast, and structure. The maximum value is 1 and minimum is 0. In this thesis SSIM is used to compare the pair-wise real-reconstruction on an average of 500 reconstructions to measure deep learning model's reconstruction efficiency.

Feature Ranking

Importance of disentangled latent representations is measured by decision tree-based classifier. This basically works by computing how much impurity is reduced by each feature and hence determining the importance of every feature in classifying the samples according to given labels. Impurity here refers to presence of samples of one category under the label of another category.

Training

The latent space dimension of the VAE is 10. The encoder is trained with images of size 256×256×3. Encoder and decoder and discriminator is of the factor-VAE is optimized using adam optimizer with decay parameters $\beta_1$=0.9, $\beta_2$=0.999 at learning rate of 0.0001. discriminator is of the factor-VAE is optimized with decay parameters $\beta_1$=0.5, $\beta_2$=0.9 at learning rate of 0.0001 and batch size of 32. Generator of the ID-GAN constituting of the resent blocks is trained with latent vector (dimension 10) and a random noise vector called as nuisance vector of dimension 256. Which is in total 266[57]. Generator and discriminator is trained at learning rate if 0.0001 using RMS prop optimizer, with batch size of 32.

Dimensionality Reduction

UMAP, which stands for Uniform Manifold Approximation and Projection, has been employed in my thesis to visualize and interpret the latent space of 10-dimensional data. For datasets used in my research related to discrete cell types, specifically Lung Cancer and LiveCell, UMAP is used to reduce the dimensionality to visualize them in a two-dimensional space. This approach allows for a better understanding of the complex subclusters and relationships among the cell types present in the data[33]. For visualizing datasets showing a biological progression or pathways, especially for generalizations 2 d.

VIA-MDS

VIA-Multi Dimensional Scaling is an embedding technique used in VIA for trajectory inference. VIA MDS has been used to demonstrate the embedding of 10-dimensional latent space in 2 dimensions to infer the progression of Epithelial to Mesenchymal Transition and cell cycle progression.

Trajectory Inference for Progression Datasets

VIA is an unsupervised trajectory inference technique that implements probabilistic approach to perform random walk in the cluster graph by preserving the fine grain resolution of the embedded trajectory[35]. This work employs VIA to demonstrate downstream visualization of 2-dimensional embedding and trajectory inferences for datasets that show continuous process such as cell cycle progression and EMT.

Example 5—Applicable Datasets

The datasets, both open-source and those imaged in-house, were chosen to demonstrate the applicability of the present approach to datasets that were diverse in multiple aspects, as shown in Table 1.

TABLE 1

| Diversity in datasets used for training and analysis | | | | | |
|---|---|---|---|---|---|
| Image Dataset | Referenced in the paper as | Image Contrast | Dataset type | Imaging Condition | Morphology |
| Cell Painting Assay | CPA | Fluorescence | Perturbation | Adherent | Irregular |
| Lung Cancer | LC | QPI | Discrete Cell Types | Suspension | Mostly spherical |
| LiveCell | LiveCell | Phase Contrast | Discrete Cell Types | Adherent | Irregular and flat |
| Epithelial to Mesenchymal Transition | EMT | Fluorescence | Continuous Process | Adherent | spherical to spindle |
| CellCycle | CellCycle | QPI | Continuous Process | Suspension | Mostly Spherical |

Primarily, the choice encompassed multiple imaging modalities and contrasts, including fluorescence, Phase Contrast, and Quantitative Phase Images. Secondly, the selection included datasets with cell populations that had exhibited a variety of biological conditions, such as responses to drug treatment (CPA), discrete cell types (lung cancer live cell captured), and those that had demonstrated continuous biological processes like cell cycle progression and Epithelial to Mesenchymal transition. Furthermore, the inclusion encompassed various imaging conditions, including adherent cells (live Cell, EMT, CPA) and cells in suspension (cell cycle and LC), and finally, a wide range of shape morphologies (spherical, spindle).

Figure 17A:
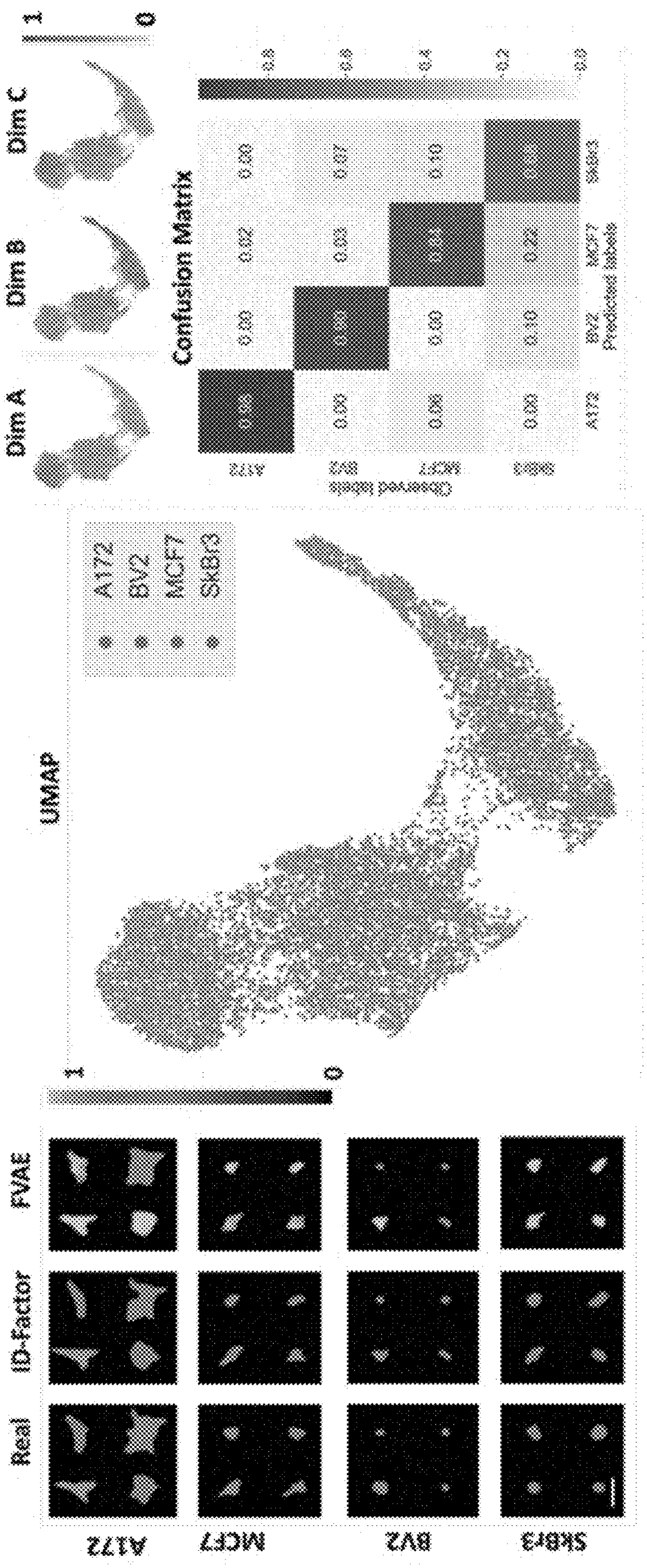
FIGS. 17A-17C show high-fidelity reconstructions from ID-GAN exhibited a realistic nature, capturing intricate details effectively.
Figure 17B:
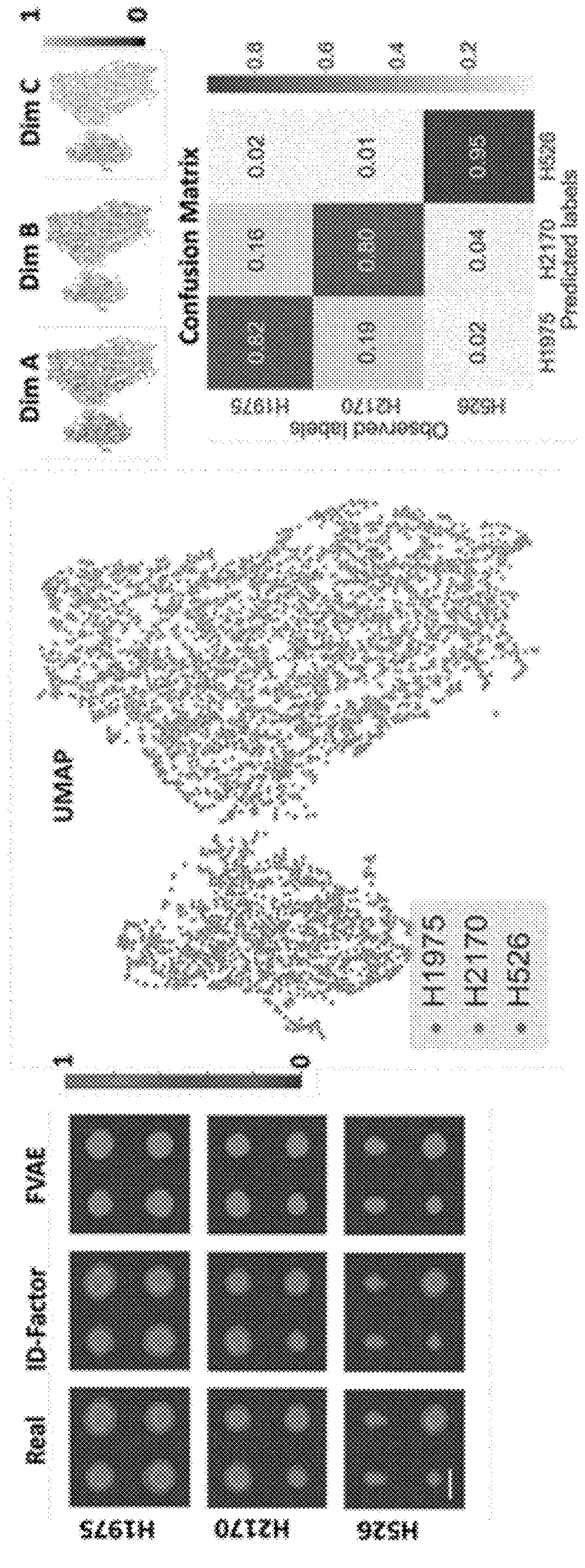
Figure 17C:
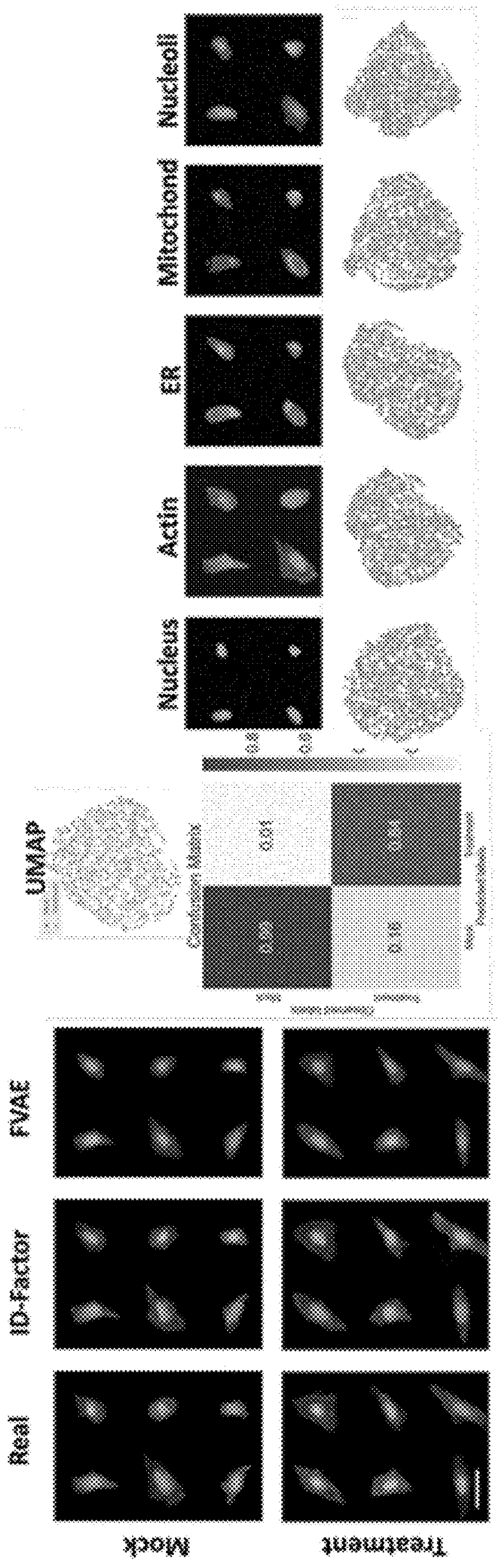

In the context of cellular image datasets, VAEs excelled in reconstructing overall attributes such as shapes, sizes, and pixel intensities. FIGS. 17A-17C showed high-fidelity reconstructions from ID-GAN exhibited a realistic nature, capturing intricate details effectively. The lost textural information in VAE's reconstructions was effectively restored through the utilization of ID-GAN, followed by two-dimensional visualizations of the 10-dimensional disentangled latent representations and classification analysis for LiveCell dataset of phase contrast images (Scale bar=20 μm) highlighting four distinct cell types—A172, BV2, MCF7, and SkBr3 (FIG. 17A); Quantitative Phase Images of three lung cancer cell types (H1975, H2170, H526) (Scale bar=15 μm) (FIG. 17B); and Cell Painting Assay, multiplexed fluorescence image dataset treated with bioactive compound (Scale bar=65 μm) (FIG. 17C). However, their ability to reproduce intricate local texture variations within cellular structures was limited. This limitation was effectively overcome through reconstructions facilitated by the Information Distillation GAN (ID-GAN). Preserving these textural characteristics was crucial for identifying heterogeneities and understanding cellular processes[10].

i. CPA Dataset

CPA dataset is subset of BBBC022, which is a publicly available fluorescence image dataset. The images consisted of U2O2 cells treated with one of the 1600 bioactive compounds. In this dataset, images consisted of 5 channels tagged with 6 dyes characterizing 7 organelles (nucleus, golgi-complex, mitochondria, nucleoli, cytoplasm, actin, endoplasmic reticulum) with 20× magnification. The dataset was provided with annotations of plate locations corresponding to the compound and the mechanism of action[11].

To test perturbations resulting from treatment with a bioactive compound in an unsupervised manner, the ID-GAN was trained in two different ways.

First, by overlaying multiple channels, either 3 or 5 channels, on images of dimensions 256×256×N, where N could be more than 1 and could extend up to the maximum number of fluorescence channels available in the dataset. The downstream visualization of 3 channels showed a combined effect of stacked channels, revealing perturbations induced by bioactive compound treatment.

Figure 21:
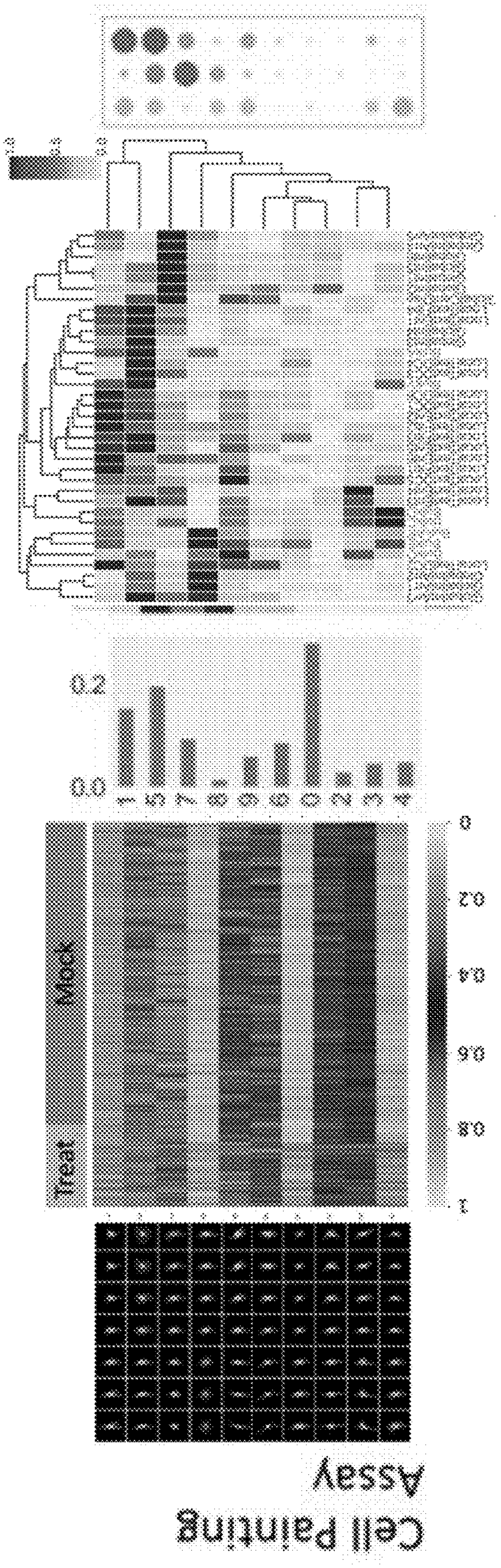
FIG. 21 depicts how the interpretation pipeline was applied to the CellPainting dataset.
Figure 22A:
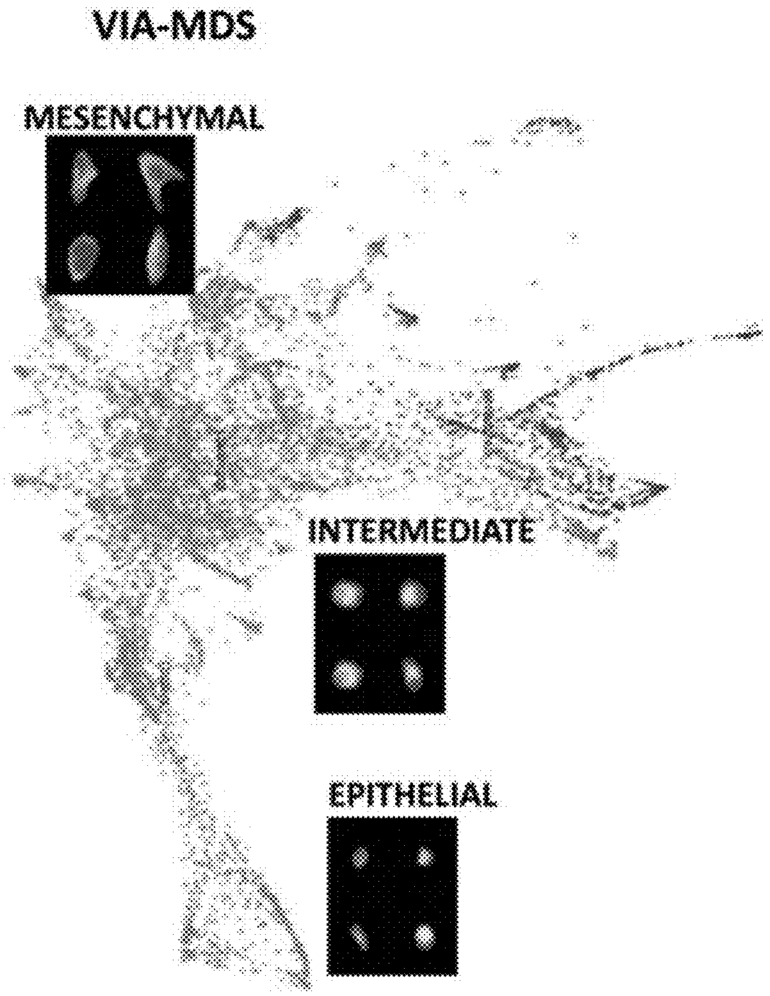
FIGS. 22A-22B show the embedding visualization and latent space analysis for Epithelial to Mesenchymal transition captured in fluorescence images.
Figure 22B:
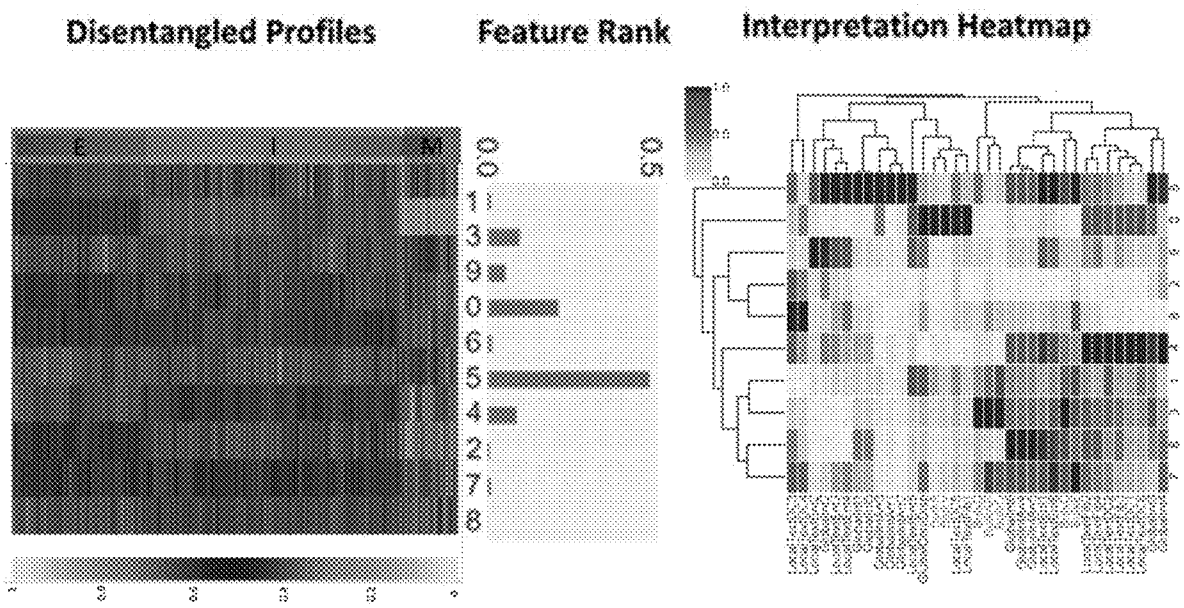
Figure 22C:
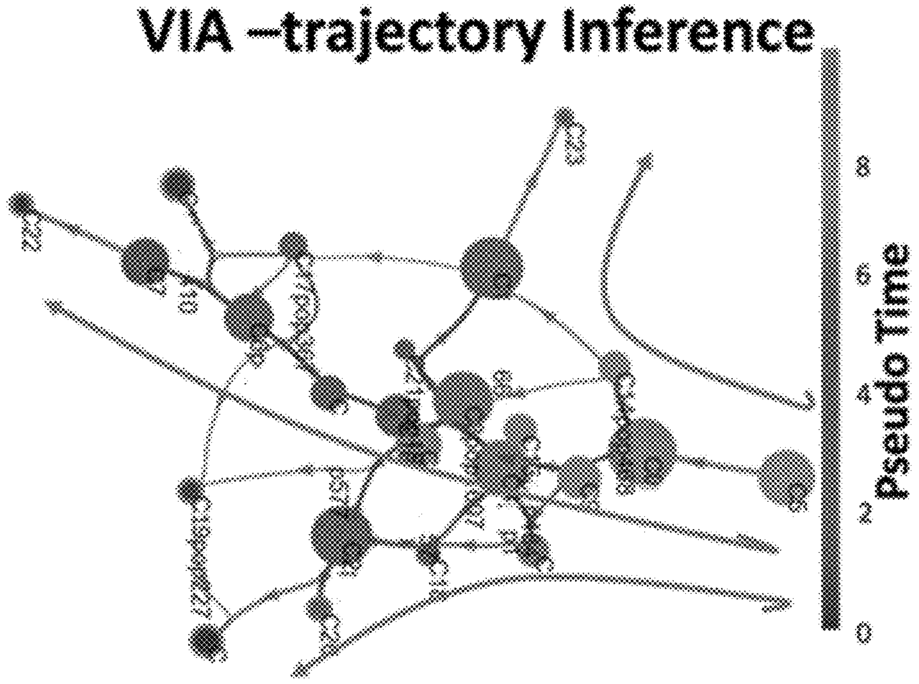
FIG. 22C shows the VIA based trajectory inference reveals 3 trajectories, and three terminal states (FIG. 22D) latent plots revel the variation of morphological aspect captured in different dimensions of the disentangled latent space.
Figure 22D:
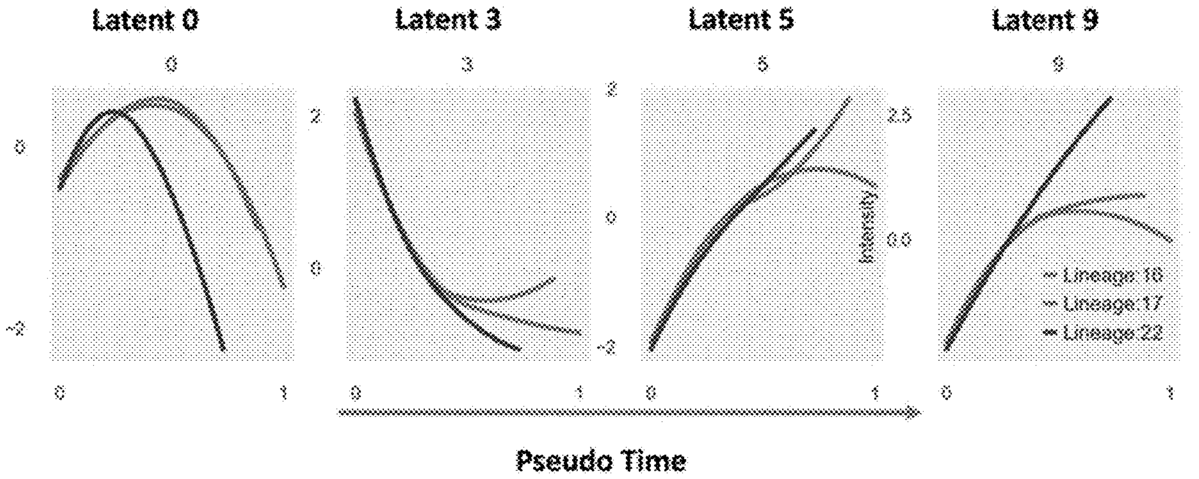

Secondly, the network was trained with separate channels to identify changes in specific organelles. One of the treatments annotated as glucocorticoid receptor agonist was used in conducting training in the work. FIG. 21 showed the reconstruction performance of ID-GAN and 2D visualization using a plot that displayed a drift in the population of cells treated with a compound whose mechanism of action was annotated as a glucocorticoid receptor agonist. The model, which had been trained with combined 3-channel single-cell images (actin, nucleoli, and nucleus), demonstrated improved discrimination between the Mock and treated populations compared to the models trained with individual organelle images. This improvement was reflected in the classification accuracy shown in the confusion matrix in FIG. 21.

ii. Lung Cancer Dataset

The lung cancer dataset was obtained from a high-throughput QPI System called Multi-ATOM[23], which retrieved the complex-field information of light transmitting through the cell and yielded two image contrasts at subcellular resolution: bright-field (BF: amplitude of the complex-field). This essentially displayed the distribution of light attenuation (or optical density) within the cell and quantitative phase. This work demonstrated that biophysical phenotyping using a label-free method could delineate three major histologically differentiated subtypes of lung cancer among seven cell lines, namely, three adenocarcinomas (H1975, H358, HCC827), two squamous cell carcinoma cell lines (H520 and H2170), and two small cell lung cancer cell lines (H526 and H69).

One cell line from each of three different lung cancer subtypes was chosen for analysis. FIG. 17B showed the clustering of three subtypes visualized in 2D based on UMAP. FactorVAE demonstrated a classification efficiency, as shown in the confusion matrix in FIG. 17B. The color-coded UMAP, with latent values corresponding to different dimensions, revealed heterogeneities and demonstrated the predictive power for discriminating cell types correctly in clustering.

Figure 17D:
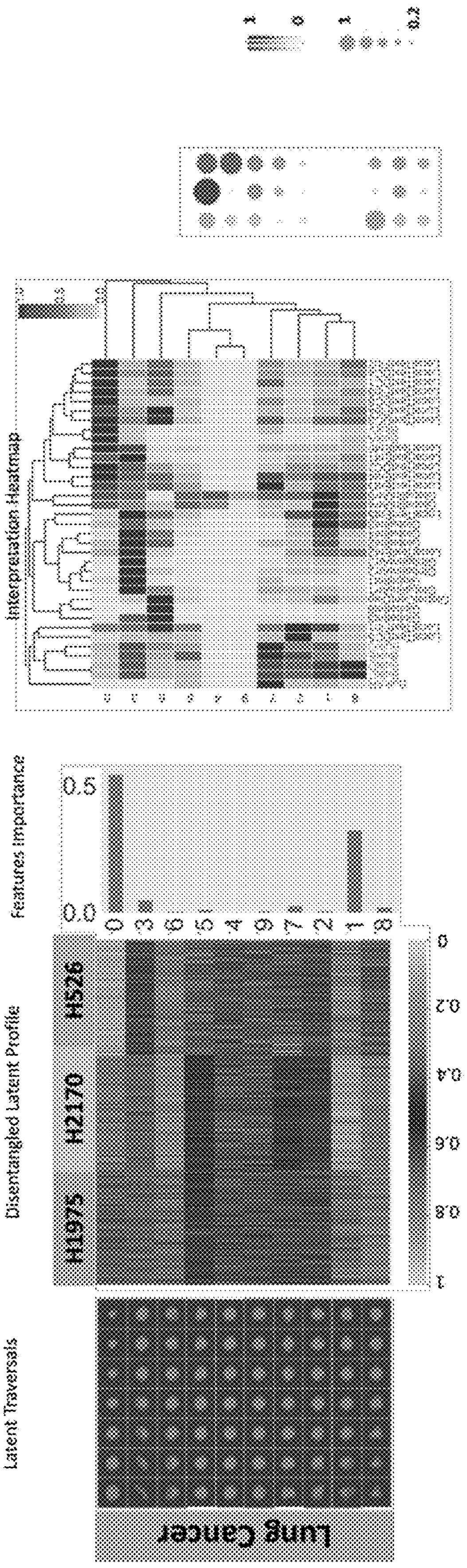
FIG. 17D depicts how the interpretation pipeline was applied to the lung cancer dataset, effectively separating bulk, global, and local features across different latent dimensions.

The interpretation steps that were further discussed shed light on the single-cell morphological attributes that determined this heterogeneity. DimA, DimB, and DimC corresponded to the Bulk, Global, and Local features of dimensions 7, 3, and 0, as seen in the summarized bubble plot in FIG. 17D, which illustrated that the disentangled latent profile in the lung cancer dataset showcased variations in morphology and heterogeneities. Distinct profile groups were identified and associated with specific cell types. The interpretation heatmap further validated these observations by revealing the expressed features corresponding to each latent dimension. Specifically, dimension 0 represented global variations, dimension 1 captured texture variations, and dimensions 7 and 8 represented bulk variations. Moreover, the feature names under bulk, global, and local categories were color-coded in red, purple, and green, respectively.

iii. LiveCell Dataset

LiveCell is a large-scale dataset consisting of Incucyte HD phase-contrast microscopy images of 5,239 manually annotated, expert-validated, with a total of 1,686,352 individual cells annotated from eight different cell types. The dataset consisted of cell types with varying shape morphologies and sizes, including round and neuronal-like structures[30]. The results were based on four selected cell types (A172, BV2, MCF7, SkBr3) with diverse morphologies and sizes. A172 is flat and irregular, BV2 is round, SkBr3 and MCF7 are round.

The UMAP plots (FIG. 17A), color-coded with latent values corresponding to different factors, reveal heterogeneities within the population. Overall, the disentangled representation in factorVAE allows for the extraction of deeper biological meaning in the 2D visualizations.

iv. EMT Dataset

EMT is foundational to various biological studies related to tissue generation, diseases etc. EMT encompasses dynamic changes in cellular organization leading to functional alterations in mobility and invasion. The importance of extracting dynamic information from live cell data was demonstrated in an application to the TGF-β-induced EMT process in the A549 cell line[29]. Single-cell dynamics showed significant trajectory-to-trajectory heterogeneity, and certain dynamic features were characteristic of a particular process, which was otherwise impossible to discern using snapshot data. In this example, dynamics in vimentin were quantified by extracting texture features (Haralick features). In the reported work, TGF-β treatment showed a shift in distribution for nearly all Haralick-related features (texture features), and the dynamics in the vimentin space displayed two trajectories during the EMT process. It did not provide annotations for cell states such as Epithelial and Mesenchymal. Hence, basic morphological operations were performed to gate and annotate Epithelial and Mesenchymal cells by measuring the aspect ratio. Elongated mesenchymal populations were separated from epithelial cells, which were generally round and small, while the remaining cells were categorized as intermediate states.

In this example, the dataset was adopted to demonstrate the capability of the framework of the present invention in revealing multiple pathways in live cell images. The unsupervised visualization of trajectories was observed, revealing multiple pathways in epithelial to mesenchymal transition.

The large FoV images, consisting of multiple cell trajectories and comprising around 19,000 cell images, were used to train ID-GAN. The latent space was visualized in 2 dimensions using VIA-MDS (FIGS. 22A-22D). Three pathways were clearly visualized as three prongs in trajectory analysis pseudo-time plots based on VIA. To confirm this, the images of mesenchymal population from three different pathways were verified, and they appeared morphologically different. The line plot of the latent dimensions along the pseudo-time indicated the differentially expressed latent features for the three pathways.

The importance of extracting dynamical information from live cell data was demonstrated in an application to the TGF-β induced EMT process in the A549 cell line. TGF-β treatment showed a shift in distribution for nearly all Haralick-related features, and the dynamics in the vimentin space displayed two trajectories during the EMT process. In the EMT dataset, the interpretation heatmap also highlighted the presence of bulk, global, and local features in dimensions 5, 2, and 3, respectively. It demonstrated that there were instances where certain features exhibited a combination and overlap across these categories, indicating that the features were not entirely independent of each other. Despite this interdependence, the approach effectively provided valuable insights into the morphological variations present in the dataset.

v. Cell Cycle Dataset

The cell cycle dataset was imaged using another novel, in-house QPI technique called Free-space Angular-Chirp-Enhanced Delay (FACED)[31]. It was an ultrafast laser-scanning technique that allowed for high imaging speed at scales orders of magnitude greater than the then-current technologies. In this example, the multimodal imaging system was integrated with a microfluidic flow cytometer platform, enabling synchronized and co-registered single-cell QPI and fluorescence imaging at an imaging throughput of 77,000 cells per second with sub-cellular resolution[32]. In this context, a systematic image analysis that correlates the biophysical and biochemical information of cells, revealing new insights into biophysical heterogeneities in many biological processes, has been demonstrated for the cell cycle dataset of MCF7 and MB231 cell types. Annotations for this dataset are provided by quantitatively tracking DNA through fluorescence staining of cells with Vybrant Dye Orange stain (Invitrogen). In this example, the MB231 dataset was used for training and analysis.

Figure 23A:
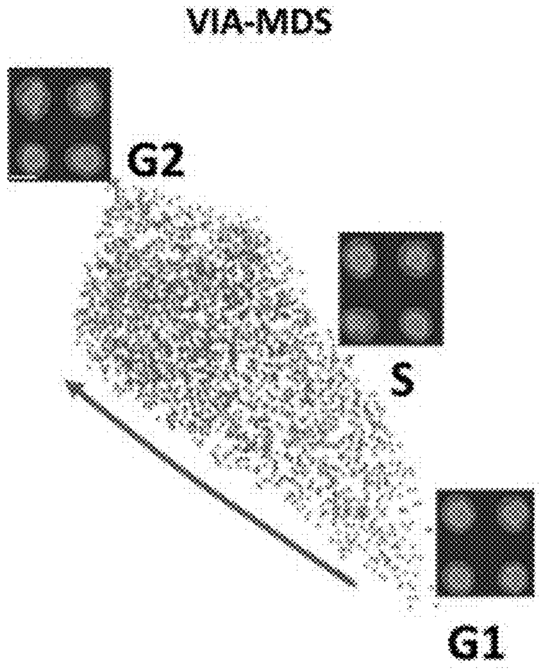
FIG. 23A depicts VIA-MDS embedding capturing the continuous progression of cellular states in cell cycle progression G1-S-G2 based on the disentangled morphological profiles.
Figure 23B:
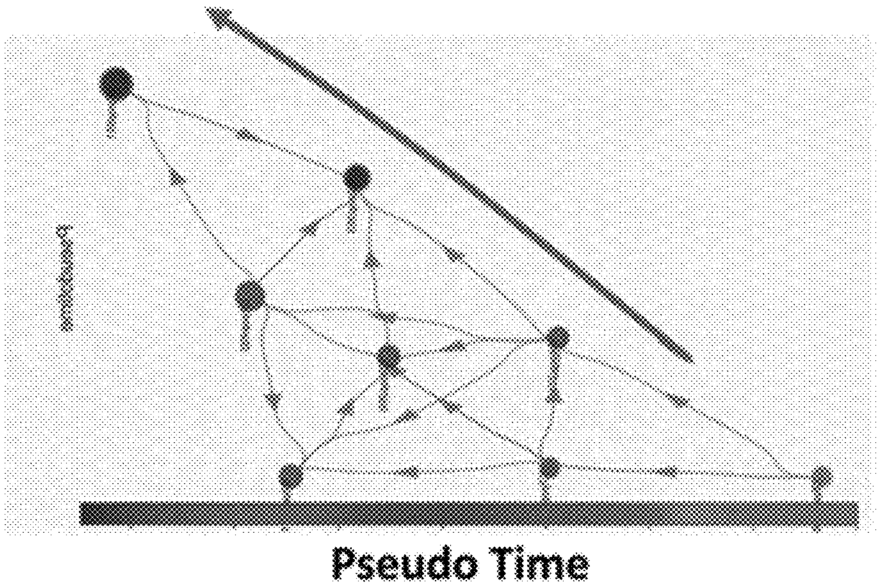
FIG. 23B shows the trajectory inference based on VIA for identifying the trajectory and dynamics in the cycle progression captured in the Quantitative Phase Image dataset.

In this example, the imaging dataset of the Cell Cycle was employed to train ID-GAN with Factor VAE. Unsupervised downstream visualization was performed to reveal heterogeneities and changing states in the cell population, along with latent space interpretation. FIG. 23A showed the 2D visualization using VIA-MDS and trajectory inference based on VIA[24], displaying pseudo-time for G1-S-G2 progression (FIG. 23B). The line plot of independent latent dimensions plotted against the pseudo-time indicated varying latent features. These variations could further be interpreted by referring to the interpretation heatmap that corresponded to Bulk, local, and global features, comprehended from the summarized plot showing the size and transparency of the bubble as the extent of the feature's expression in different categories and latent dimensions.

Definition

The "ID-GAN" consists of a hybrid architecture that combines a variant of variational Autoencoders (VAEs) called Factor VAE and generative Adversarial Networks (GANs) to achieve interpretable, high-quality cell image generation. However, the ID-GAN architecture can also be substituted with any combination of models capable of acquiring disentangled representations and performing high-fidelity image reconstructions or translation tasks. An interesting application can be observed when learning disentangled representations from bright field images and then translating them into quantitative phase images, i.e., image translation. This enhances versatility in working with different imaging modalities, such as multimodal image morphological profiling and cross-modality image translation tasks.

The "Interpretation heatmap" serves as a tool for displaying features that are strongly expressed during traversals in relation to the disentangled latent dimensions. This heatmap sheds light on the important aspects of cellular features captured in the latent space, enhancing the interpretability of representations within the framework. In this invention, the profile interpretation is performed by establishing a connection between hierarchical single-cell feature variability and the learned latent space. The interpretation heatmap, specific to the training dataset, reveals groups of correlated features captured by latent dimensions. This insight is then extended to interpret predictions for test datasets. To identify latent features with strong discriminatory potential for recognizing heterogeneities, a ranking of latent features is conducted. The heatmap confirms the validity and relevance of the features that contribute to accurate predictions on test data.

Reference throughout this specification to "one embodiment", "an embodiment", "an example", "an implementation," "a disclosed aspect", or "an aspect" means that a particular feature, structure, or characteristic described in connection with the embodiment, implementation, or aspect is included in at least one embodiment, implementation, or aspect of the present disclosure. Thus, the appearances of the phrase "in one embodiment", "in one example", "in one aspect", "in an implementation", or "in an embodiment", in various places throughout this specification are not necessarily all referring to the same embodiment. Furthermore, the particular features, structures, or characteristics may be combined in any suitable manner in various disclosed embodiments.

As utilized herein, terms "component", "system", "architecture", "engine" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

Unless otherwise indicated in the examples and elsewhere in the specification and claims, all parts and percentages are by weight, all temperatures are in degrees Centigrade, and pressure is at or near atmospheric pressure. Other than in the operating examples, or where otherwise indicated, all numbers, values and/or expressions referring to quantities of ingredients, reaction conditions, etc., used in the specification and claims are to be understood as modified in all instances by the term "about".

With respect to any figure or numerical range for a given characteristic, a figure or a parameter from one range may be combined with another figure or a parameter from a different range for the same characteristic to generate a numerical range.

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

INDUSTRIAL APPLICABILITY

The present invention is expected to broadly impact the technologies and strategies for morphological profiling of cells/tissues, which are increasingly promising in many applications, from drug discovery (notably there are a few emerging biotechnology companies adopting image-based assays e.g. Recursion, Insitro), basic biology research to clinical diagnosis.

REFERENCES: THE DISCLOSURES OF THE FOLLOWING REFERENCES ARE INCORPORATED BY REFERENCE

[1] V. Ljosa, K. L. Sokolnicki, and A. E. Carpenter, "Annotated high-throughput microscopy image sets for validation," *Nature methods*, vol. 9, no. 7, pp. 637-637, 2012, doi: 10.1038/nmeth.2083.

[2] E. Williams et al., "Image Data Resource: a bioimage data integration and publication platform," *Nature methods*, vol. 14, no. 8, pp. 775-781, 2017, doi: 10.1038/NMETH.4326.

[3] P. J. Thul et al., "A subcellular map of the human proteome," *Science* (*American Association for the Advancement of Science*), vol. 356, no. 6340, pp. 820-820, 2017, doi: 10.1126/science.aa13321.

[4] N. H. Cho et al., "OpenCell: Endogenous tagging for the cartography of human cellular organization," *Science* (*American Association for the Advancement of Science*), vol. 375, no. 6585, pp. eabi6983-eabi6983, 2022, doi: 10.1126/science.abi6983.

[5] M. P. Viana et al., "Integrated intracellular organization and its variations in human iPS cells," *Nature* (*London*), vol. 613, no. 7943, pp. 345-354, 2023, doi: 10.1038/s41586-022-05563-7.

[6] G. P. Way et al., "Morphology and gene expression profiling provide complementary information for mapping cell state," ed. Cold Spring Harbor: Cold Spring Harbor Laboratory Press, 2021.

[7] "Cell states beyond transcriptomics: integrating structural organization and gene expression in hiPSC-derived cardiomyocytes," *Obesity, fitness*, & *wellness week*, p. 851, 2020.

[8] A. E. Carpenter et al., "CellProfiler: image analysis software for identifying and quantifying cell phenotypes," *Genome biology*, vol. 7, no. 10, pp. R100-R100, 2006, doi: 10.1186/gb-2006-7-10-r100.

[9] K. C. M. Lee, J. Guck, K. Goda, and K. K. Tsia, "Toward Deep Biophysical Cytometry: Prospects and Challenges," *Trends in biotechnology* (*Regular ed.*), vol. 39, no. 12, pp. 1249-1262, 2021, doi: 10.1016/j.tibtech.2021.03.006.

[10] D. M. D. Siu et al., "Deep-learning-assisted biophysical imaging cytometry at massive throughput delineates cell population heterogeneity," *Lab on a chip*, vol. 2, no. 2, pp. 3696-378, 2020, doi: 10.1039/d01c00542h.

[11] M.-A. Bray et al., "Cell Painting, a high-content image-based assay for morphological profiling using multiplexed fluorescent dyes," *Nature protocols*, vol. 11, no. 9, pp. 1757-1774, 2016, doi: 10.1038/nprot.2016.105.

[12] W. Samek, G. g. Montavon, A. Vedaldi, L. K. Hansen, and K.-R. Müller, "Explainable AI: interpreting, explaining and visualizing deep learning," *Explainable artificial intelligence,* 2019, doi: 10.1007/978-3-030-28954-6.

[13] E. Tjoa and C. Guan, "A Survey on Explainable Artificial Intelligence (XAI): Towards Medical XAI," *arXiv.org,* 2020, doi: 10.1109/TNNLS.2020.3027314.

[14] D. P. Kingma and M. Welling, "Auto-Encoding Variational Bayes," ed. Ithaca: Cornell University Library, arXiv.org, 2022.

[15] Z. Wu et al., "DynaMorph: self-supervised learning of morphodynamic states of live cells," *Molecular biology of the cell*, vol. 33, no. 6, pp. ar59-ar59, 2022, doi: 10.1091/mbc.E21-11-0561.

[16] A. Zaritsky et al., "Interpretable deep learning of label-free live cell images uncovers functional hallmarks of highly-metastatic melanoma," ed. Cold Spring Harbor: Cold Spring Harbor Laboratory Press, 2020.

[17] H. Kobayashi, K. C. Cheveralls, M. D. Leonetti, and L. A. Royer, "Self-supervised deep learning encodes high-resolution features of protein subcellular localization," *Nature methods*, vol. 19, no. 8, pp. 995-1003, 2022, doi: 10.1038/s41592-022-01541-z.

[18] A. Vedaldi, H. Bischof, T. Brox, and J.-M. Frahm, "High-Fidelity Synthesis with Disentangled Representation," vol. 12371, (Lecture Notes in Computer Science. Switzerland: Springer International Publishing AG, 2020, pp. 157-174.

[19] H. Kim and A. Mnih, "Disentangling by Factorising," 2018, doi: 10.48550/arxiv.1802.05983.

[20] C. P. Burgess et al., "Understanding disentangling in $\beta$-VAE," 2018, doi: 10.48550/arxiv.1804.03599.

[21] I. Higgins et al., "SCAN: Learning Hierarchical Compositional Visual Concepts," 2017, doi: 10.48550/arxiv.1707.03389.

[22] A. v. d. Oord, O. Vinyals, and K. Kavukcuoglu, "Neural Discrete Representation Learning," 2017, doi: 10.48550/arxiv.1711.00937.

[23] K. C. M. Lee et al., "Multi-ATOM: Ultrahigh-throughput single-cell quantitative phase imaging with subcellular resolution," *Journal of biophotonics*, vol. 12, no. 7, pp. e201800479-n/a, 2019, doi: 10.1002/jbio.201800479.

[24] S. V. Stassen, G. G. K. Yip, K. K. Y. Wong, J. W. K. Ho, and K. K. Tsia, "Generalized and scalable trajectory inference in single-cell omics data with VIA," *Nature communications*, vol. 12, no. 1, pp. 5528-5528, 2021, doi: 10.1038/s41467-021-25773-3.

[25] M. L. Montero, J. S. Bowers, R. P. Costa, C. J. H. Ludwig, and G. Malhotra, "Lost in Latent Space: Disentangled Models and the Challenge of Combinatorial Generalisation," 2022, doi: 10.48550/arxiv.2204.02283.

[26] A. Kumar, P. Sattigeri, and A. Balakrishnan, "Variational Inference of Disentangled Latent Concepts from Unlabeled Observations," 2017, doi: 10.48550/arxiv.1711.00848.

[27] E. Becht et al., "Dimensionality reduction for visualizing single-cell data using UMAP," *Nature biotechnology*, vol. 37, no. 1, pp. 38-44, 2019, doi: 10.1038/nbt.4314.

[28] K. R. Moon et al., "Visualizing structure and transitions in high-dimensional biological data," *Nature biotechnology*, vol. 37, no. 12, pp. 1482-1492, 2019, doi: 10.1038/s41587-019-0336-3.

[29] W. Wang et al., "Live-cell imaging and analysis reveal cell phenotypic transition dynamics inherently missing in snapshot data," *Science advances*, vol. 6, no. 36, 2020, doi: 10.1126/sciadv.aba9319.

[30] C. Edlund et al., "LIVECell—A large-scale dataset for label-free live cell segmentation," *Nature methods*, vol. 18, no. 9, pp. 1038-1045, 2021, doi: 10.1038/s41592-021-01249-6.

[31] Q. T. K. Lai et al., "High-speed laser-scanning biological microscopy using FACED," *Nature protocols*, vol. 16, no. 9, pp. 4227-4264, 2021, doi: 10.1038/s41596-021-00576-4.

[32] G. G. K. Yip et al., "Multimodal FACED imaging for large-scale single-cell morphological profiling," *APL photonics*, vol. 6, no. 7, pp. 70801-070801-10, 2021, doi: 10.1063/5.0054714.

[33] R. T. Q. Chen, X. Li, R. Grosse, and D. Duvenaud, "Isolating Sources of Disentanglement in Variational Autoencoders," 2018, doi: 10.48550/arxiv.1802.04942.

[34] M.-A. Carbonneau, J. Zaidi, J. Boilard, and G. Gagnon, "Measuring Disentanglement: A Review of Metrics," *IEEE transaction on neural networks and learning systems*, vol. PP, pp. 1-15, 2022, doi: 10.1109/TNNLS.2022.3218982.

What is claimed is:

1. A method for unsupervised identification of single-cell morphological profiling based on deep learning, wherein the method comprises the following steps:

collecting and pre-processing at least one single-cell image data;

training Variational Autoencoder (VAE) by defining an arbitrary dimension size of a latent space;

distilling a learnt latent space from the VAE to Generative Adversarial Network (GAN) and training a generator-discriminator combination within the GAN;

generating a realistic image aligned with the learnt latent space; and interpreting data by incorporating statistical variance analysis and hierarchical clustering.

2. The method of claim 1, wherein step of collecting and preprocessing the at least one single-cell image data comprises center-aligning cells within the single-cell image data and masking cells to eliminate background noise.

3. The method of claim 1, further comprising performing downstream tasks comprising visualization and trajectory inference after training the VAE.

4. The method of claim 1, wherein the step of training the VAE comprises mapping at least one high-dimensional images into the latent space in an unsupervised manner, the at least one high-dimensional images are reduced to the latent space via an encoder, and the reduced images are reconstructed via a decoder, and wherein the latent space is considered disentangled if the VAE learns independent factors of variation in each dimension of the latent space.

5. The method of claim 4, wherein the at least one high-dimensional images with morphologically similar cells are mapped into closely spaced aggregates in the latent space.

6. The method of claim 1, wherein the discriminator is trained to detect if the image generated from the generator is real or fake.

7. The method of claim 1, wherein the method further comprising generalizing to analyze new, unseen datasets acquired from different imaging modalities or contrasts.

8. The method of claim 1, wherein the VAE is configured to learn disentangled representations or generative factors and learn how to reconstruct images from those factors, and step of training the VAE comprises reconstructing at least one target image from the decoder based on latent space representations predicted by the encoder.

9. The method of claim 8, wherein the step of training the VAE comprises defining arbitrary number of latent dimensions, and the method further comprises using the generator-discriminator combination within the GAN to generate images based on the latent dimensions, so as to generate a series of related images by traversing the latent space, thereby moving within the latent space to explore different image features.

10. The method of claim 9, wherein N*1 cell images are generated by traversing one dimension, and d represents the number of the latent dimensions and N*d cell images are generated by traversing the d latent dimensions, wherein the method further comprises: extracting F manually defined cellular features from each cell image in latent traversal such that a N*F feature matrix is created with using the generated N*1 cell images.

11. The method of claim 10, further comprising:

computing statistical variance of the F features along the latent traversal comprising the N cell images so as to generate a variance vector 1*F for the single traversal;

performing the computing statistical variance for the F features along the d dimension, so as to obtain d*F variance values; and obtaining a variance matrix representing the d*F variance values.

12. The method of claim 11, further comprising:

preparing a single-cell gallery as a dataset;

sampling K number of images from the dataset for obtaining K number of the variance matrices; and computing statistical mean of the obtained K number of the variance matrices to generate a variance matrix which has d rows and F columns, wherein the hierarchical clustering is performed based on the mean-variance matrix, so as to obtaining groupings visualized in the form of a cluster map.

13. A programmable computer for identifying single-cell morphological profiling based on deep learning, comprising:

a processing unit configured to:

collect at least one single-cell image data via a user input and pre-process the single-cell image data;

train Variational Autoencoder (VAE) by defining an arbitrary dimension size of a latent space;

distil a learnt latent space from the VAE to Generative Adversarial Network (GAN) and train a generator-discriminator combination within the GAN;

generate a realistic image aligned with the learnt latent space; and interpret data by incorporating statistical variance analysis and hierarchical clustering.

14. The programmable computer of claim 13, wherein step of collecting and preprocessing the at least one single-cell image data comprises center-aligning cells within the single-cell image data and masking cells to eliminate background noise, and the programmable computer further comprises a memory configured to store the single-cell image data.

15. The programmable computer of claim 13, further comprising performing downstream tasks comprising visualization and trajectory inference after training the VAE, wherein the programmable computer further comprises an output interface configured to display a visualization result.

16. The programmable computer of claim 13, wherein the VAE is configured to learn disentangled representations or generative factors and learn how to reconstruct images from those factors, and step of training the VAE comprises reconstructing at least one target image from the decoder based on latent space representations predicted by the encoder.

17. The programmable computer of claim 16, wherein the step of training the VAE comprises defining arbitrary number of latent dimensions, and the processing unit is further configured to use the generator-discriminator combination within the GAN to generate images based on the latent dimensions, so as to generate a series of related images by traversing the latent space, thereby moving within the latent space to explore different image features, wherein the programmable computer further comprises a memory configured to store the series of the related images.

18. The programmable computer of claim 17, wherein N*1 cell images are generated by traversing one dimension, and d represents the number of the latent dimensions and N*d cell images are generated by traversing d latent dimensions, wherein the method further comprises: extracting F manually defined cellular features from each cell image in latent traversal such that a N*F feature matrix is created with using generated N*1 cell images.

19. The programmable computer of claim 18, wherein the processing unit is further configured to:

compute statistical variance of the F features along the latent traversal comprising the N cell images so as to generate a variance vector 1*F for the single traversal;

compute statistical variance of F features along to the d dimension, so as to obtain d*F variance values; and obtain a variance matrix representing the d*F variance values and send the variance matrix to the memory.

20. The programmable computer of claim 19, wherein the processing unit is further configured to:

prepare a single-cell gallery as a dataset;

sample K number of images from the dataset for obtaining K number of the variance matrices; and compute statistical mean of the obtained K number of the variance matrices to generate a mean-variance matrix which has d rows and F columns, wherein the hierarchical clustering is performed based on the mean-variance matrix, so as to obtaining groupings visualized in the form of a cluster map, wherein the programmable computer further comprises an output interface configured to display the visualized groupings.

* * * * *